United States Patent [19]

Tarng

[11] Patent Number: 5,474,144
[45] Date of Patent: Dec. 12, 1995

[54] TWIN-WHEEL MOTORCAR WITH DIFFERENTIAL HEIGHT AND SPEED MECHANISMS

[76] Inventor: Min M. Tarng, 1367 Glenmoor Way, San Jose, Calif. 95129

[21] Appl. No.: 143,129

[22] Filed: Oct. 26, 1993

Related U.S. Application Data

[63] Continuation-in-part of Ser. No. 852,002, Mar. 16, 1992, abandoned, which is a continuation-in-part of Ser. No. 662,717, Mar. 1, 1991, abandoned.

[51] Int. Cl.$^6$ .................................................. B60K 17/16
[52] U.S. Cl. .......................... 180/76; 71/650; 100/9.26; 100/264; 100/377; 296/107; 296/155; 297/354.13; 280/763.1
[58] Field of Search ......................... 180/76; 74/650

[56] References Cited

U.S. PATENT DOCUMENTS

| | | | |
|---|---|---|---|
| 2,286,575 | 6/1942 | Ronning | 180/76 |
| 2,415,596 | 2/1947 | Larison | 180/76 |
| 2,838,124 | 6/1958 | Cramer, Jr. | 180/76 |
| 4,183,418 | 1/1980 | Dudas | 180/76 |
| 4,316,520 | 2/1982 | Yamamoto et al. | 180/76 |
| 4,548,096 | 10/1985 | Giocastro et al. | 74/650 |

*Primary Examiner*—Kenneth R. Rice

[57] ABSTRACT

The twin-wheel motorcar has twin wheels with single side wheels driving capabilities. Twin-Wheel Motorcar has sliding doors, top cover, emergency parking pad, single arm differential height steering shock-tube mechanism and in-hub non-divided axle friction-free non-contact force differential speed driving mechanism.

34 Claims, 32 Drawing Sheets

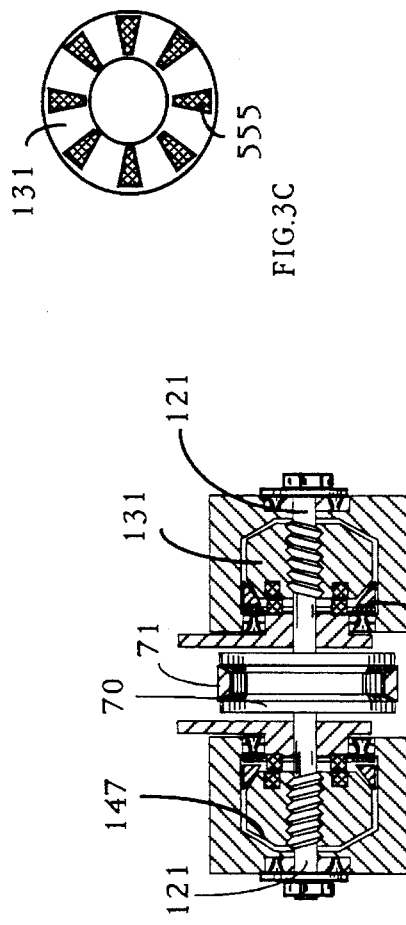
FIG.3A
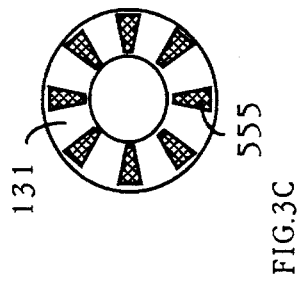
FIG.3B
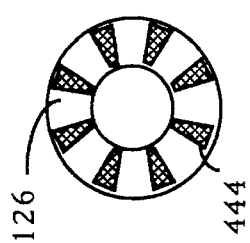
FIG.3C
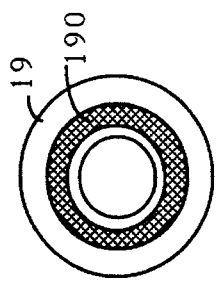
FIG.3D
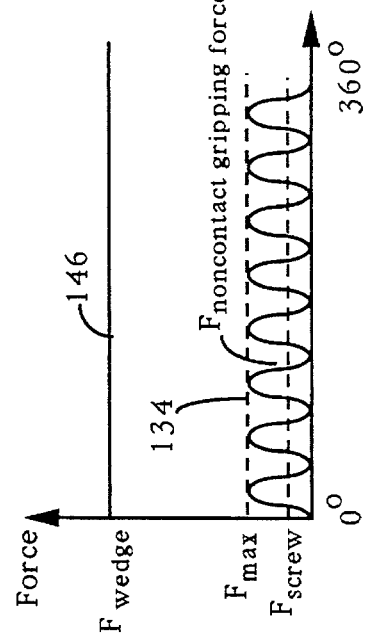
FIG.3E
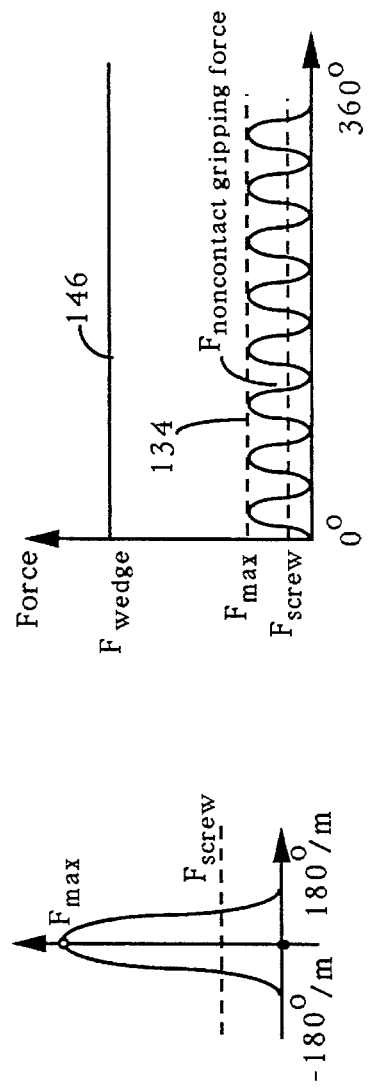
FIG.3F
FIG.3G

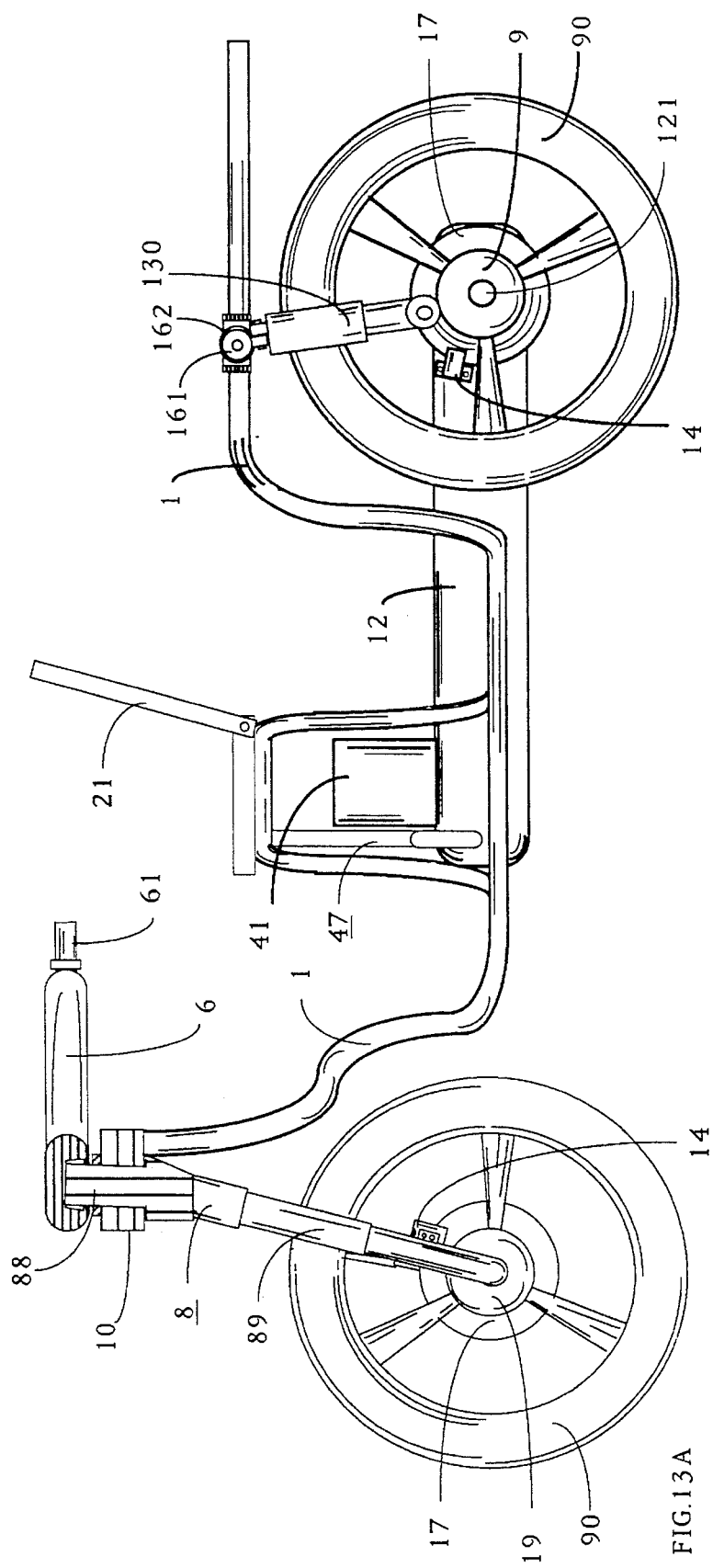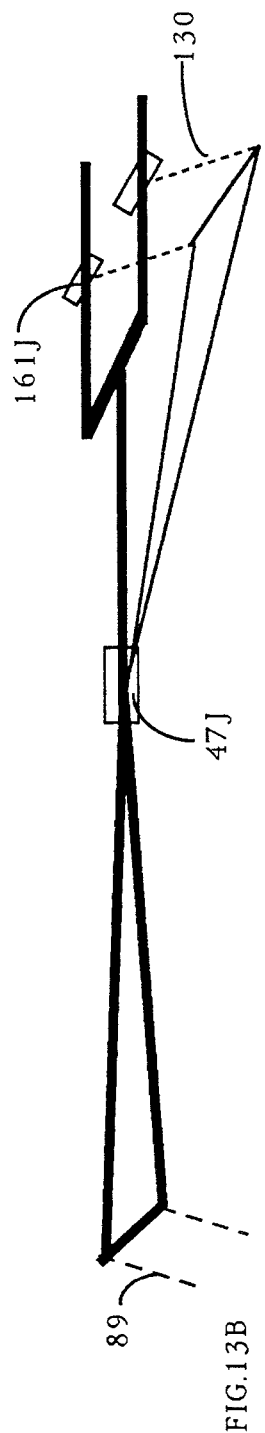
FIG.13A
FIG.13B

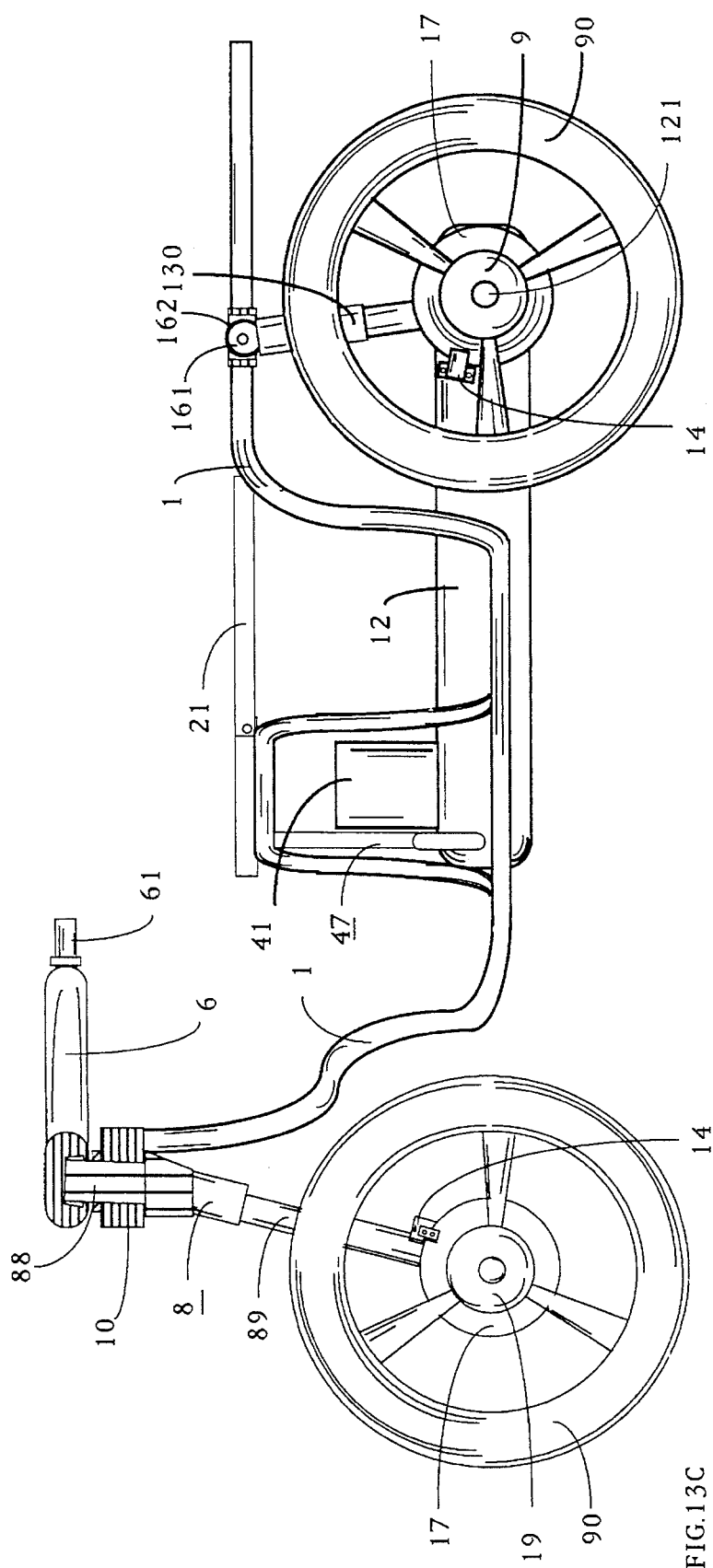
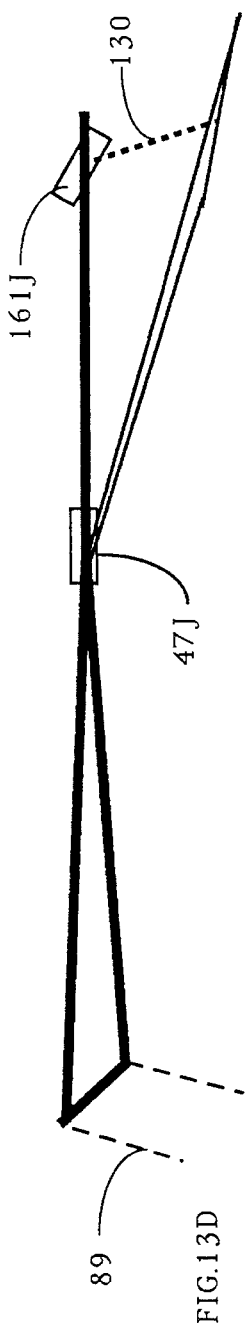
FIG.13C
FIG.13D

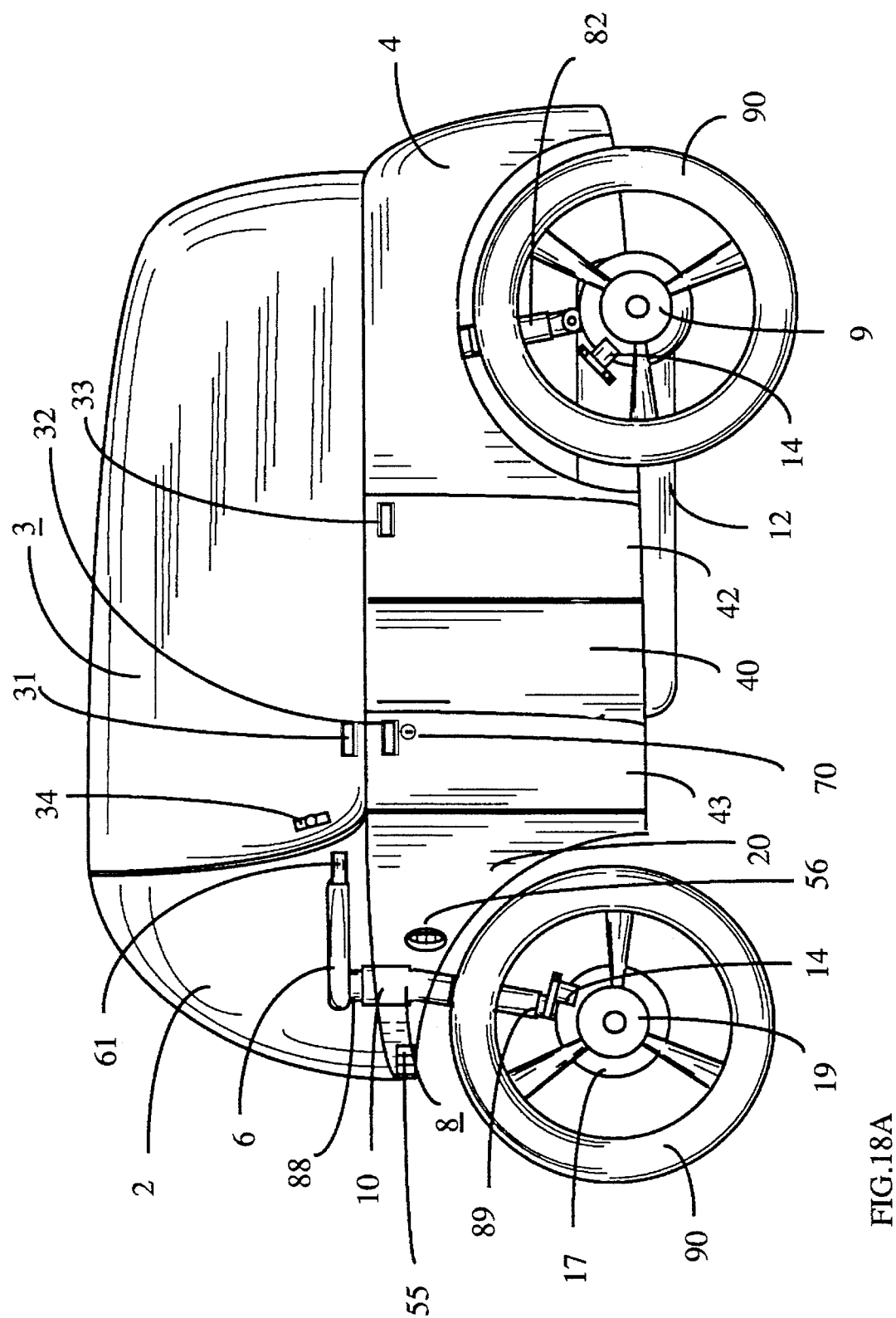

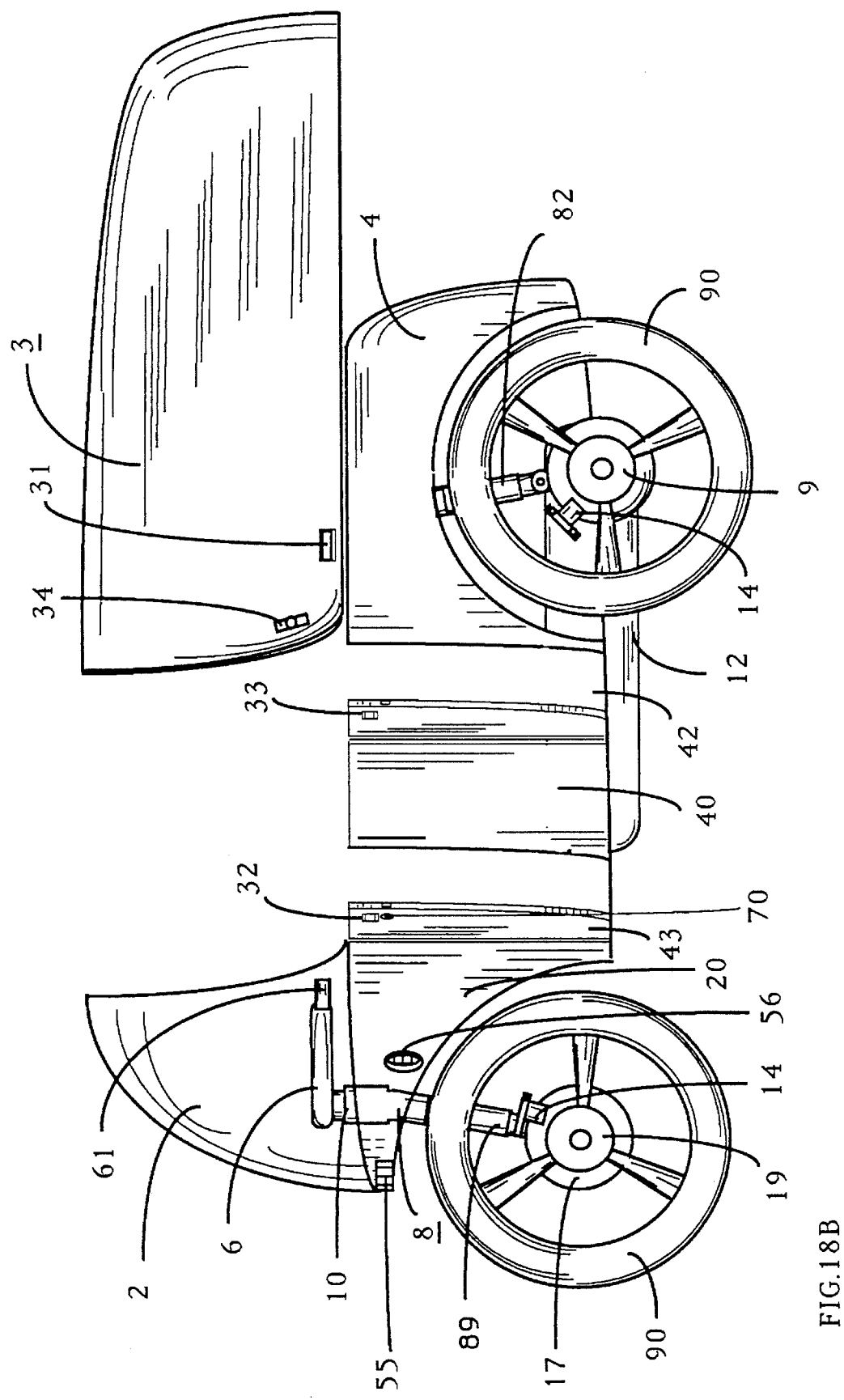

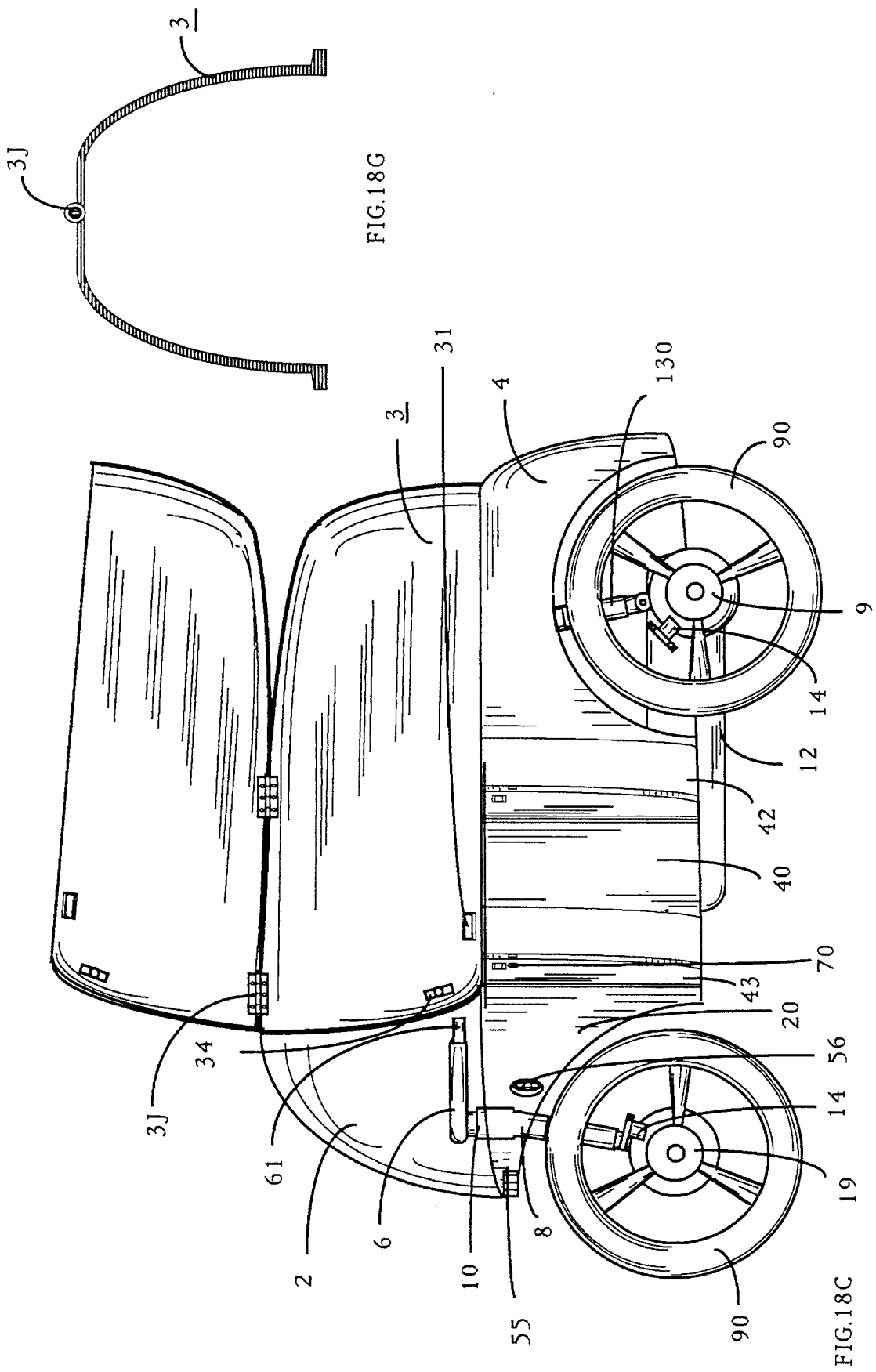

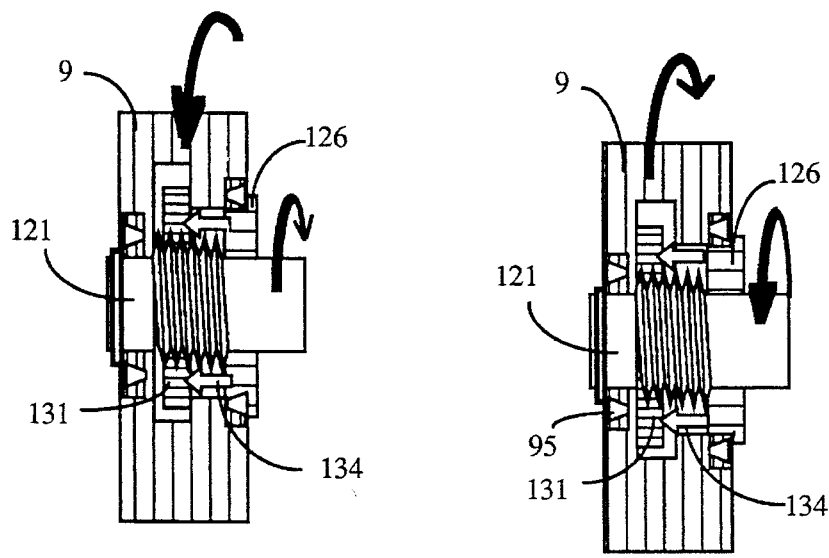
FIG. 32A
FIG. 32B
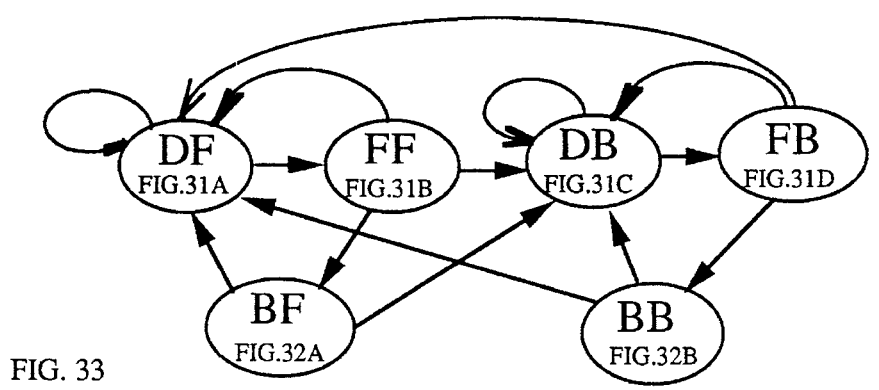
FIG. 33
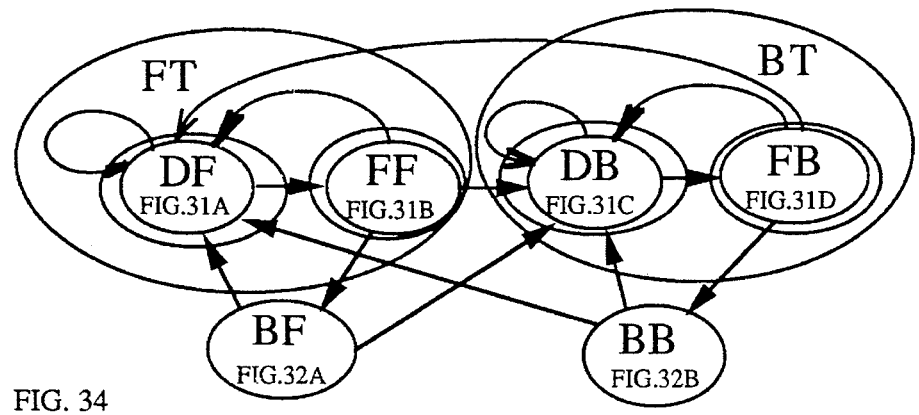
FIG. 34

TWIN-WHEEL MOTORCAR WITH DIFFERENTIAL HEIGHT AND SPEED MECHANISMS

This is a continuation-in-part of Ser. No. 07/852,002, filed Mar. 16, 1992, now abandoned, which is a continuation-in-part of Ser. No. 07/662,712, filed Mar. 1, 1991, now abandoned.

BACKGROUND

1. Field of Invention

To solve the traffic, commuting and parking problems in metropolis, motorcar has twin wheels with single arm differential height steering shock-tube and nondivided continuous axle having friction-free non-contact force differential speed engaging drive and single-sided wheels driving capabilities.

2. Description of Prior Art

Today there are two main private transportation facilities: car and motorcycle. However, they are neither the best transportation facility. Between the motorcycle and the automobile, there is a gap for the transportation facilities, i.e., single driver car. As the load and safty requirement increase, there is the need for the motorcar having the stability of automobile and the convenience of the motorcycle. The ways of motorcar operations are the hybrid of the automobile and the motorcycle. The key difference between the motorcycle and automobile is the motorcycle can tilt and use two-wheel to drive. The automobile cannot tilt to raise-up one side two wheels and uses the single side two wheels to drive. Stopping at the signal light, the automobile doesn't need to use the feet to support the vehicle during the vehicle.

Motorcar is the best transporation facility having both the advantages of car and motorcycle. It is safe, economic, convenience, saving traffic time, saving money and comfortable. The conventional car has four wheels and coverage. However, the cost is high and it wastes fuel. It causes the traffic congestion in cities. The motorcycle has only two wheels. As the motorcycle stops before the traffic light, the rider needs to use two feet to support the motorcycle to keep balance. It causes the motorcycle to have no coverage. In the chilly or rainy weather, it is very uncomfortable to ride the motorcycle. It is very dangerous in the traffic accident. However, it is very convenient and easy to move during the traffic congestion. The parking problem is also less difficult for motorcycle. However, it is impossible to scale down the car size to the size of motorcycle. Duing to the transmission and differential boxes of conventional cars, the car width is hard to be reduced. It needs the breakthrough in several aspects. Furthermore, the conventional differential mechanism of automobile drives the fast wheel. The four wheel automobile cannot run on the slippery field road and raise up single side wheels to counter balance the eccentric force. It is meanless to build a minicar having motorcycle size but cannot drive everywhere with high speed as the motorcycle does.

The motorcar of my invention has made several breakthroughs to have the advantages of both car and motorcycle. It adopts two front twin-wheels and two rear twin-wheels. The rider doesn't need to use feet to support the car. It makes the coverage be implementable. There are two differential mechanisms: the differential height mechanism for the front twin-wheel and the differential speed mechanism for the rear drive twin-wheel. The differential drive mechanism is inside the hub. The car width can be reduced to be the width of twin wheels. During turning directions, the driving twin-wheels may rotate at different speeds. The slow wheel is driven with larger force. So my motorcar can run through the muddy road and drive with single side wheels as the motorcycle does. The differential steering mechanism of the front fork is the single arms changing their length independently. The wheels may adjust the length of single arm during turning direction. The front fork adopts the bending arm structure. It reduces the variance of length of single arms in turning direction with the addition of side-moving capability. The front fork tilts backward slightly that it still keeps the front wheels point forward in the natural position. To have the twin wheel design for the front fork, the front fork adopts the single arm design, i.e., one shock tube for each wheel. It saves the space and cost. The shock tube of the front wheel has the functions of differential height mechanism, steering, raising up one side wheel and cushion. The single arm steering shock tube has the special design that the shock tube only can slide up and down, cannot rotate. No other shock tube has the special function as the single arm steering shock tube does. The novel top cover designs adapts to the operations in the narrow parking space.

My motorcarkeeps the motorcycle driving style and the single sided wheels driving capability. Since the car width is narrow, in the high speed turning, two wheels on the outside of my motorcar may raise up. There is no need of the braking mechanism to lock the outside raising wheels as the automobile does. This driving style is similar to the motocycle.

Due to the wide car width or the need of locking mechanism for their the raised-up wheels, no other three-wheel motocycle or four-wheel motorcycle has the single-side wheels driving capability. The U.S. Pat. No. 2,286,575 issued to Ronning uses the differential mechanism of conventional automobiles for both differential speed mechanism and differential height mechanism. Ronning's patent doesn't have the single-side wheel driving capability. The U.S. Pat. No. 4,070,032 being issued to Cunningham doesn't have the differential mechanism installed in the hub. Furthermore, his driving is one wheel drive, not a differential drive at all. As two wheels drives straight forward with the same speed, the driving force should be the same. Cunningham's one wheel driving mechanism is installed in the transmission box, not in hub. During the straight forward driving, his car uses the left-rear single wheel drive; during the straight backward driving, his car uses the right-rear single wheel drive. It is not a differential drive. Even installing my differential mechanism inside the hubs of Cunningham's patent, it still cannot modify the Cunningham's to be the differential drive. Furthermore, Cunningham's car doesn't have the concept of twin-wheel that his car cannot raise up one side wheels. It cannot operate as the motorcycle does. It cannot run on the slippery muddy road. His front fork doesn't have the differential height mechanism. The U.S. Pat. No. 4,153,266 issued to Uhls is twin arm shock tube. It cannot be used as the single arm steering shock tube. Even the combination of the Uhls' patent and Cunningham's patent, it cannot reduce the width as narrow as the width of twin wheel to have the capability to raise up one side wheels.

The engaging mechanism of my differentail drive mechanism adopts the lateral noncontact magnetic force to grip the engaging drum. There is no breakage of the mechanical component. There is no loss of the momentum and energy due to the friction force. The U.S. Pat. No. 2,246,191 issued to Schmitz used the radial friction force. Schmitz' gripping fingers is easily broken. Schmitz' patent originally designed for the Children's toy. It is not for the high speed motorcar.

Furthermore, until now, none thinks of the novel innovation of the differential mechanism with the engaging mechanism. The idea is simple but not an obvious one.

My motorcar adopts two differential mechanism: the differential height mechanism for the front wheel and the differential speed mechanism for the rear driving wheel. The U.S. Pat. No. 2,286,575 issued to Ronning shows a motorcycle equipped with the differential height mechanism. His differential height mechanism adopts the differential mechanism of the convential car. The differential mechanism of convential car is too large to be used on the twin-wheel type motorcar. Even worse, the front wheels have the impulse impact from the road. The conventional differential mechanism cannot respond the impulse impact. The differential function fails and the mechanical parts will be destroyed. My invention is the first to use the shock tube as the differential height mechanism.

There two patents show both differential height mechanism and the differential speed mechanism are worthy of patent. The U.S. Pat. No. 836,035 issued to Hendricks shows a differential speed mechanism for the continuous undivided axle. However, at high speed, it's free-running mode doesn't exist. At high speed, it's operation will switch from the driving mode to the brake mode directly, bypass the free-running mode. My invention adopts different approaches for both differential height mechanism and differential speed mechanism. These differential problems are never recognized by the other people who are familar with the shock tube and the vehicle drive. Recognizing these differential problems and solving these differential problem are worthy of patents.

The differential height mechanism of my invention is the single arm steering shock tube for twin wheels. Two wheels having close alignment is referred as twin wheel. One front wheel has only one shock tube is referred as single arm. The single arm steering shock tube has the multiple functions of differential height, cushion, steering, single side wheels driving capability, saving space and cost.

The cover of my invention can be operated in a very narrow space. It can slide backward, raise sideward with half of the shell. With the same structure, it is easily changed to be the hood. None of the previous inventions has the same capabilities.

It is noted that the rear wheels of Wallis' tricycle doesn't have the differential speed mechanism. The tilt of Wallis' tricycle is to pull the rear wheels to change the direction of rear wheels to reduce the lateral rubbing of rear wheels. To change the direction of rear wheels, the joints of the Wallis' tricycle are universal joints.

The rear wheels of my motorcar have the differential speed mechanism. My motorcar doesn't need to change the direction of rear wheels at all. The tilt of my motorcar is to have soft landing. To have the soft landing, my motorcycle adopts the resilient pivot joints. However, Wallis' frame uses the universal joint that Wallis' tricycle cannot raise up single side wheels. As Wallis' tricycle raises up one side wheels, the frame will be bent that the tricycle falls to ground. My motorcar use the resilient pivot joints and resilient yoke that my motor car can raise up one side wheels. The difficult part is that all the joints must be located on one single line like the spline does. The design purposes and functions of my tilting mechanism is completely different from the design purposes and functions of Wallis' patent. So the tilting mechanism of my motorcar is completely different from the tilting mechanism of Wallis' tricycle.

In summary, free running is very important for fuel economy; twin wheel is very important for space economy. My in-hub differential speed mechanism has both fuel economy and space economy to save traffic time and parking space. The previous patents fails to have free-running at high speed. The mechanical parts of previous patents are easily broken at high speed due to frictions. The previous patents has no single side wheel driving capability at all. The conventional differential mechanism caused the width of car is hard to be reduced and having no single side driving capability. My invention solves the problems of high speed vehicle occupying narrow space. The problems are coverage, narrow space, stability and field drive. The stability problem induces the tilt and raise up one side wheel to have single side driving problem. The field drive needs the steering shock tube and the slippery road driving capability. The narrow space and single side driving exclude the conventional differential mechanism. Previous patents are designed for the low speed toys. At high speed, we must consider the breakage of mechanical parts, friction and cushion. Due to tilt and raise up wheel, we not only consider the longitudinal cushion but also transveral cushion. We need whole system design to meet all the specifications, not pieces of combination of existed prior arts. None of existed prior arts having the complete set of functions. Without the complete set of solution, it is the reason that we still doesn't have the best transportation facility, i.e., motorcar.

My invention is to offer the complete set of functions. My invention adopts the twin wheels, in-hub differential speed mechanism and steering shock tube differential height mechanisms. To tilt and raise up and land wheels smoothly, my invention has combined the tilt, shock tube, resilient yoke and pivot joint to be an integrated design. To have the stability, coverage and operate in narrow parking space, my patent adopted the universal top cover, sliding door, side emergency supporting pad and auxiliary supporting pad. The universal top cover can slide backward, raise-up sideward or exchanged to be hood cover. All the covers are exchangable.

OBJECTS AND ADVANTAGES

The motorcar has the rear twin-wheel with the differential speed mechanism and the front twin-wheel with the differential height mechanism. The differential speed mechanism is installed at two ends of an undivided continuous axle. The differential height mechanism is the single arm steering shock tube. The twin wheel can be aligned very close to each other. Motorcar has the combinatory advantages of car and motorcycle to solve the traffic problems in the metropolis. Its cost is comparable with the motorcycle and it saves the fuel. It is safe and comfortable as the car. It saves the commuting time and reduces the stress during the traffic. It doesn't have the weathering and parking problem. It is the ideal private transportation facility in the metropolis.

DRAWING FIGURES

FIG. 3 (A) is the section view of the noncontact force differential driving mechanism; (B) is the section view of the noncontact force mechanism; (C) is the section view taken at C—C line in FIG. 3B, it shows the poles of noncontact force embedded in the engaging drum; (D) is the section view taken at D—D line in FIG. 3B, it shows poles of noncontact force embedded in the frame; (E) is the section view taken at E—E line in FIG. 3B, it shows poles of noncontact force embedded in the hub; (F) is the distribution curve of the noncontact force; (G) is the principle of the noncontact force differential mechanism.

FIG. 4 (A) is the section view of the upper bound lateral force differential driving mechanism; (B) the detailed structure of the upper bound lateral force engaging mechanism; (C) is the top view of the gripper; (D) is the side view of the gripper; (E) is the principle of the lateral upper-bounded force engaging mechanism in the differential mechanism.

Figure 2A:
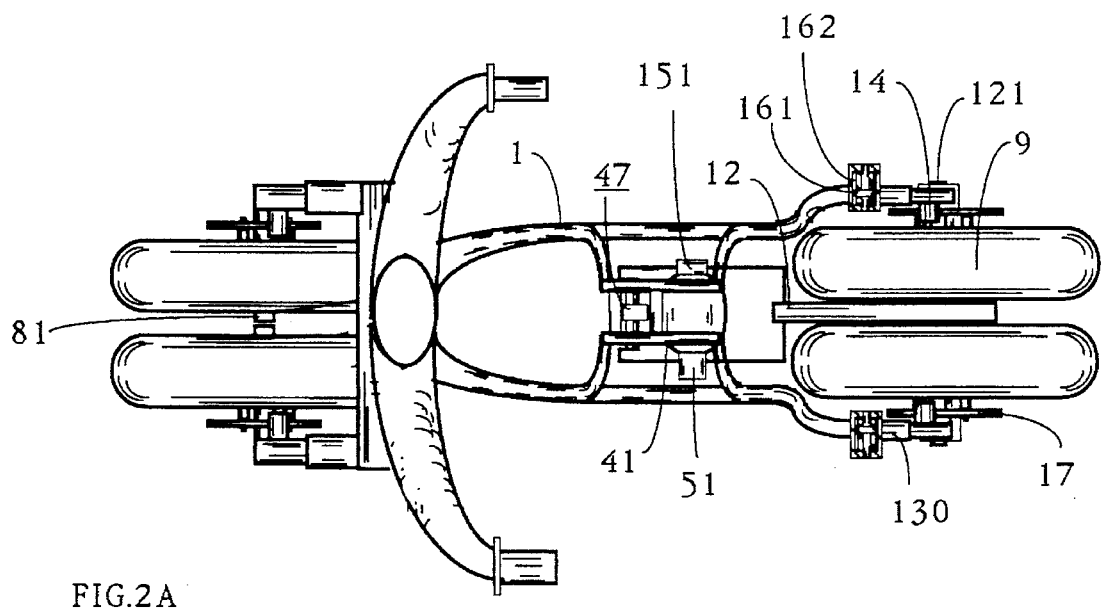
FIG. 2 (A) is the top view of the framework of the motorcar with twin wheels; (B) is the top view of the alternative framework design of the motorcar.

FIG. 5 (A) is the partially exposed view of the rear wheel and framework in FIG. 2A; the noncontact differential driving mechanism is embedded in the hub; (B) is the partially exposed view of the rear wheel and framework in FIG. 2B; the upper bound lateral force differential driving mechanism is embedded in the hub.

Figure 6:
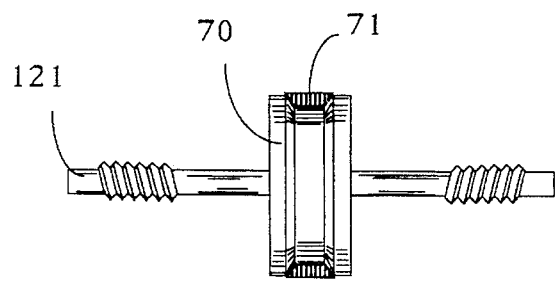

FIG. 6 is an illustrated example of the nondivided continuous driving axle.

Figure 7:
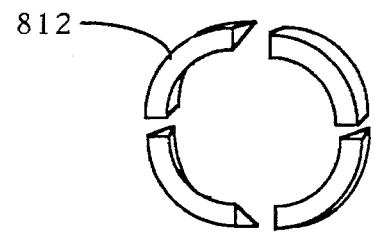

FIG. 7 is the perspective view of the wedging block.

FIG. 8 (A) is the yoke to hang the frame structure of the transmission box; (B) is the alternative design of the yoke to hang the frame structure of the transmission box.

Figure 9A:
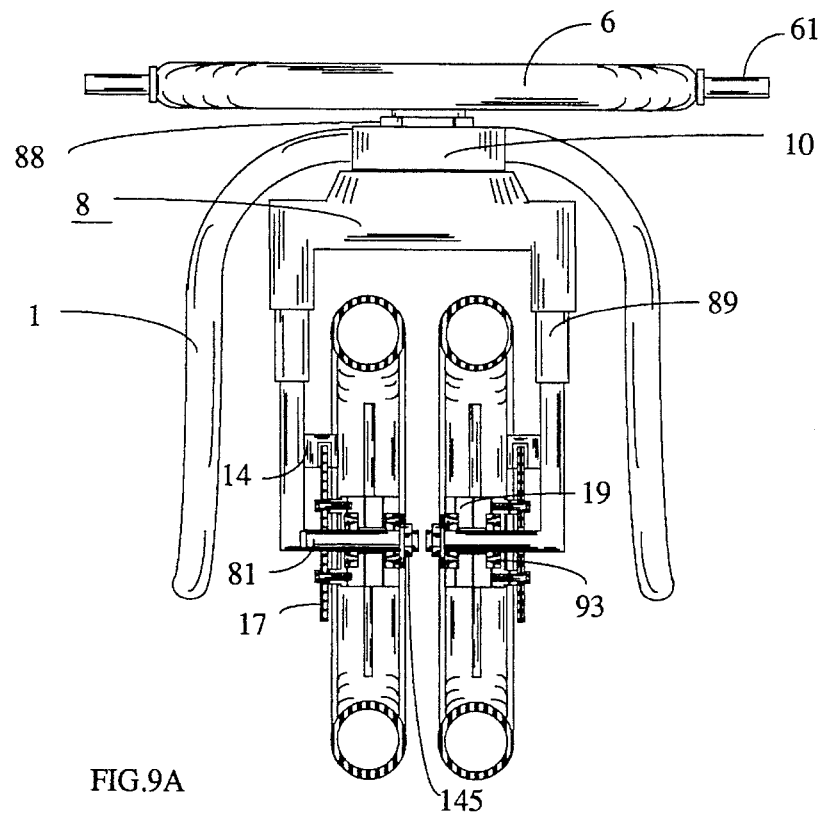
Figure 9B:
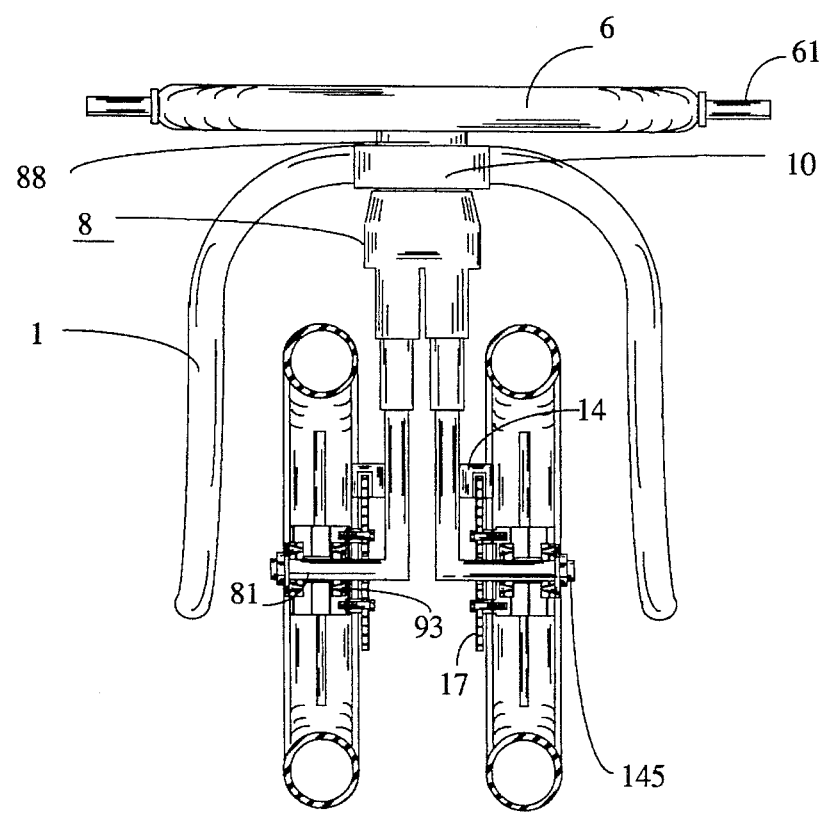

FIG. 9 (A) is the partial exposed view of the front twin wheel with the single arm steering shock tube; (B) is the partial exposed front view of the alternative design for the single arm steering shock tube.

Figure 10A:
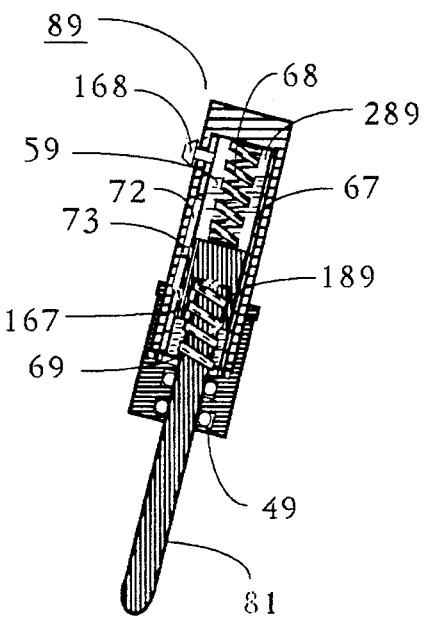
Figure 10B:
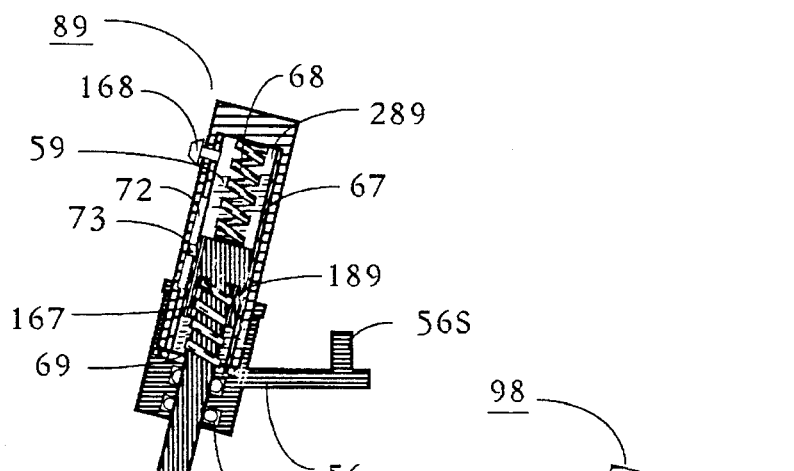
Figure 10C:
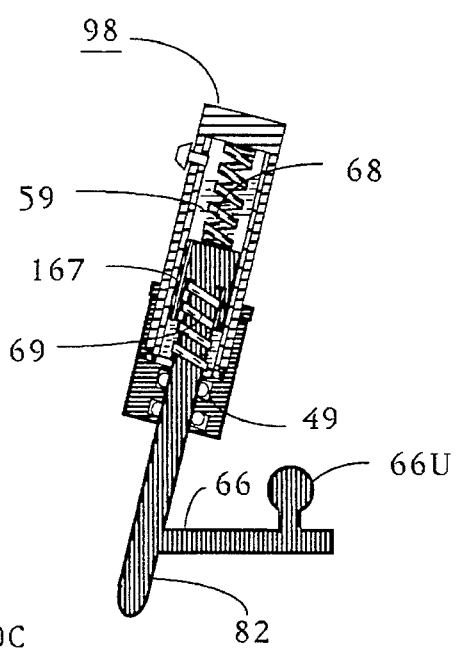
Figure 11A:
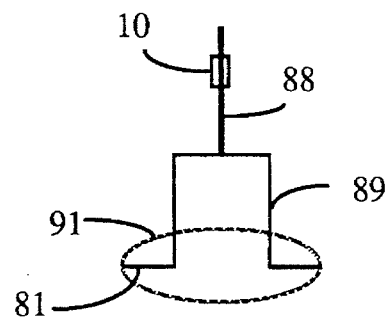
Figure 11B:
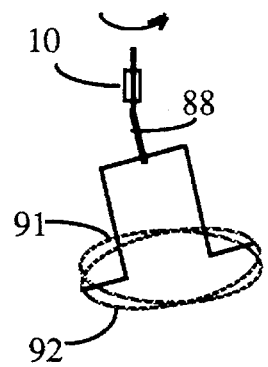
Figure 11C:
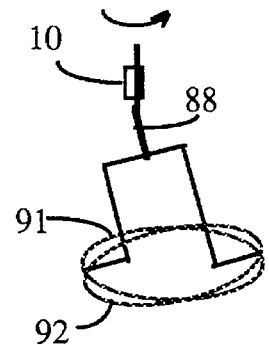
Figure 11D:
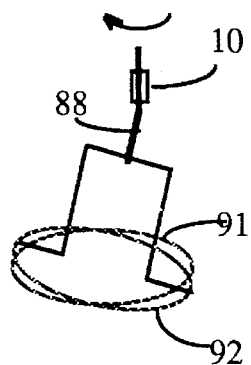
Figure 11E:
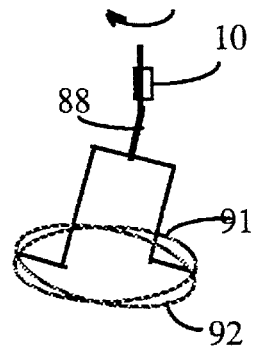

FIG. 10 (A) is the single arm steering shock tube; (B) is the steering upper arm shock tube; (C) is the steering lower arm shock tube.

FIG. 11 (A) is the steering mechanism of the front fork in the natural position; (B) is the steering mechanism turning left; (C) is the length adjustment of the single arms in the left turning; (D) is the steering mechanism turning right; (E) is the length adjustment of the single arms in the right turning.

FIG. 12 is the relative motion of wheels in the steering action: (A) is the normal position; (B) is the steering mechanism in left turning; (C) the steering mechanism returns to the normal position from the left turning; (D) is the steering mechanism in right turning; (E) the steering mechanism returns to the normal position from the right turning.

FIG. 13 (A) is the side elevational view of the framework of the motorcar with the twin wheels and raised seat back; (B) is the mechanism for the motorcar in FIG. 13A; (C) is the side elevational view for the alternative design of the motorcar with the seat back lying down to form a saddle seat; (D) is the mechanism for the motorcar in FIG. 13C.

FIG. 14 (A) is the snow belt having a central protrusion; (B) is the slotted tire having a central slot; (C) is the tension wheel having the central slot.

FIG. 15 (A) is the mechanism of the sliding door; (B) is the section view of the sliding door; (C) is the rollers of the sliding door; (D) is the track of the sliding door.

FIG. 16 is the side supporting pad; (A) the side supporting pad stands on ground; (B) is the front view of FIG. 16A; (C) the side supporting pad retrieves into the door; (D) is the front view of the side supporting pad in FIG. 16C; (E) the foot operated auxiliary support; (F) the retrieve of the auxiliary support.

Figure 17:
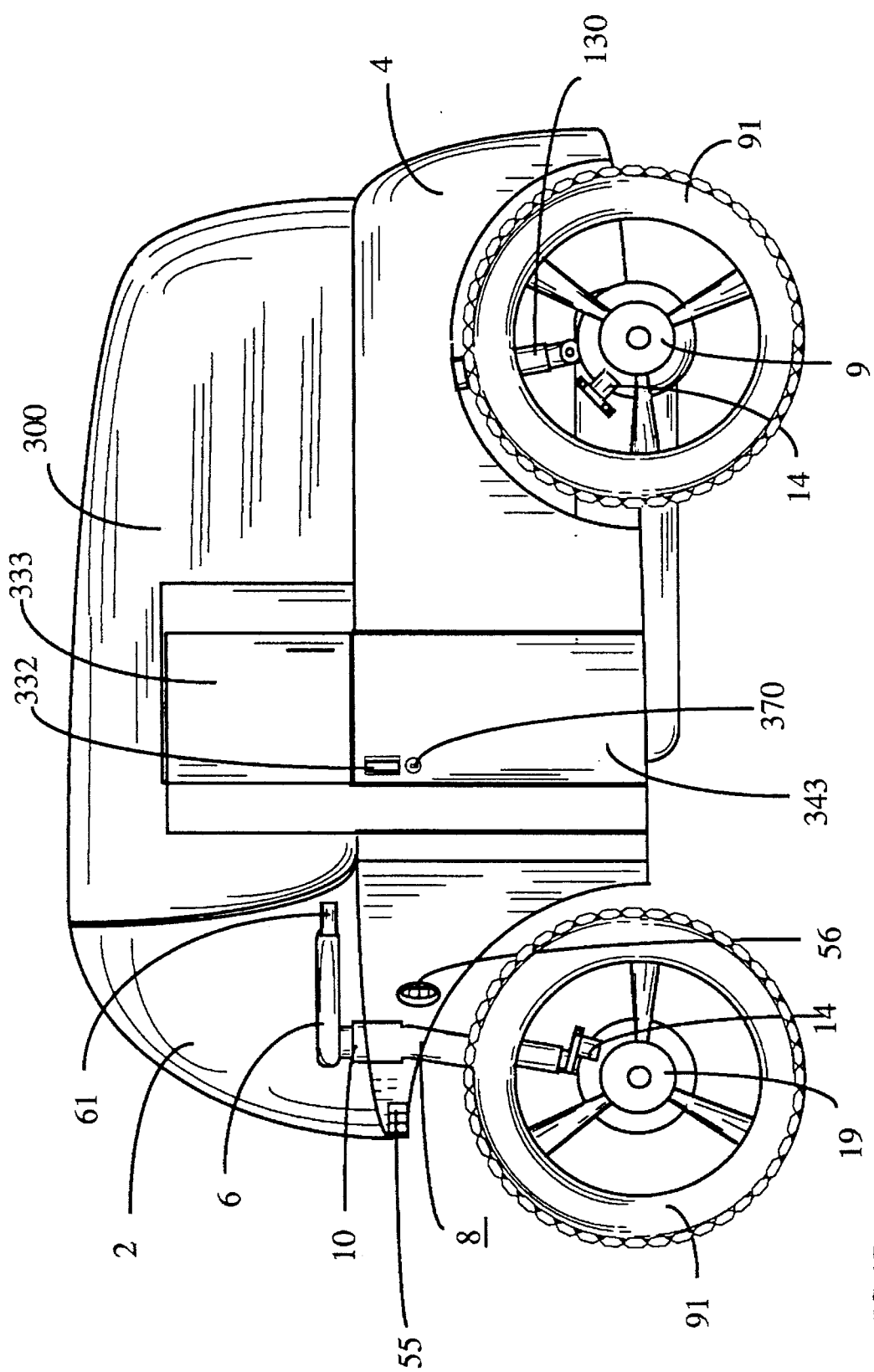

FIG. 17 is the motorcar having the sliding door; the motorcar is equipped with the snow tires.

FIG. 18 (A) is the side elevational view of the motorcar with the sliding top cover; the doors are closed; the sliding top cover is closed; (B) is the side elevational view of the motorcar having the doors opened and the top cover slided backward; (C) is the side elevational view of the motorcar with the top cover raising up; the doors are open and the cover is raised up; (D) is the side elevational view of the motorcar with the hood top cover; (E) is the side elevational view of the motorcar having the hood top cover slided backward; (F) is the motorcar having multiple sections of sliding top cover; (G) is the front view of the frame structure of the top cover.

FIG. 19 is the sealing mechanism for the sliding slot of the sliding top cover; (A) is the sealing mechanism in the seal position; (B) is the release of sealing mechanism in the release position; (C) is the sealing mechanism during the closure of the top cover; (D) the sealing mechanism also can be applied to the hood cover.

Figure 20A:
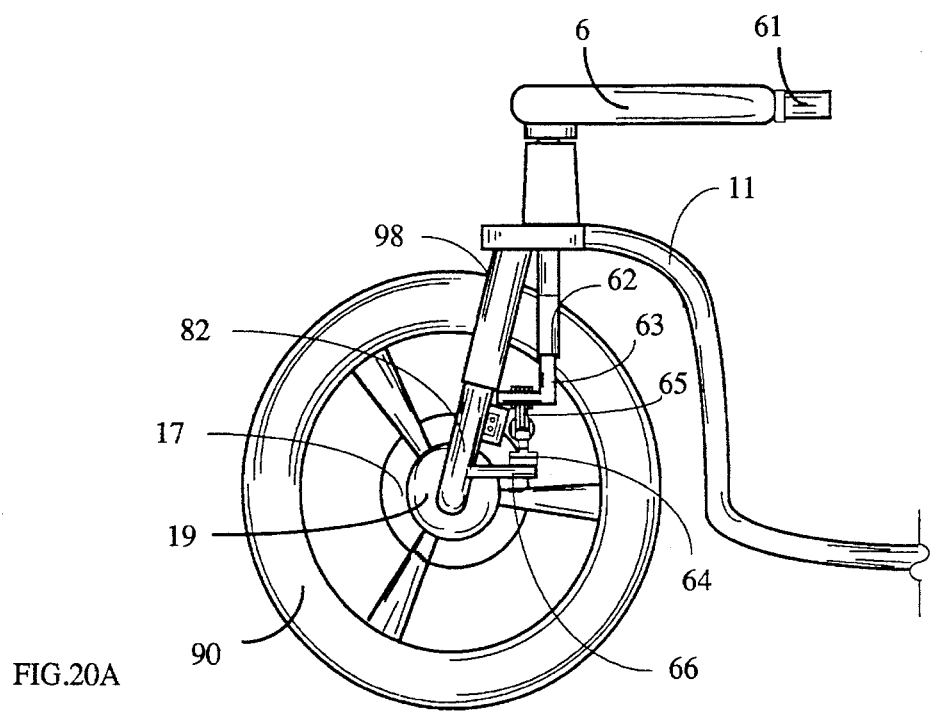
Figure 20B:
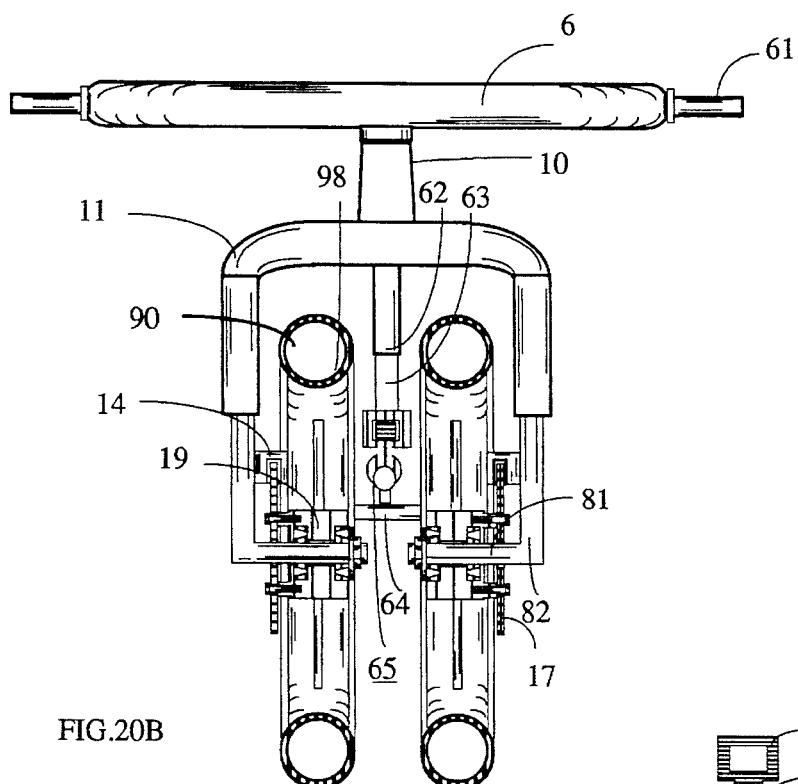
Figure 20C:
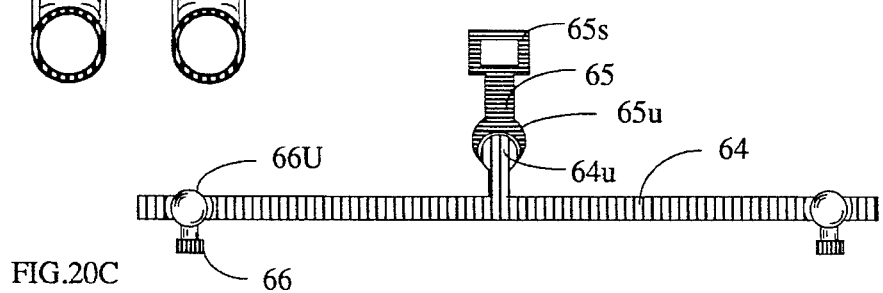

FIG. 20 (A) is the side elevational view of the front wheel, framework and the front fork with swing-low-arm steering shock tube; (B) is the partial exposed front view of the front wheel, framework and the front fork with swing-low-arm steering shock tube; (C) is the steering level for the lower-arm-steering shock tube.

Figure 21A:
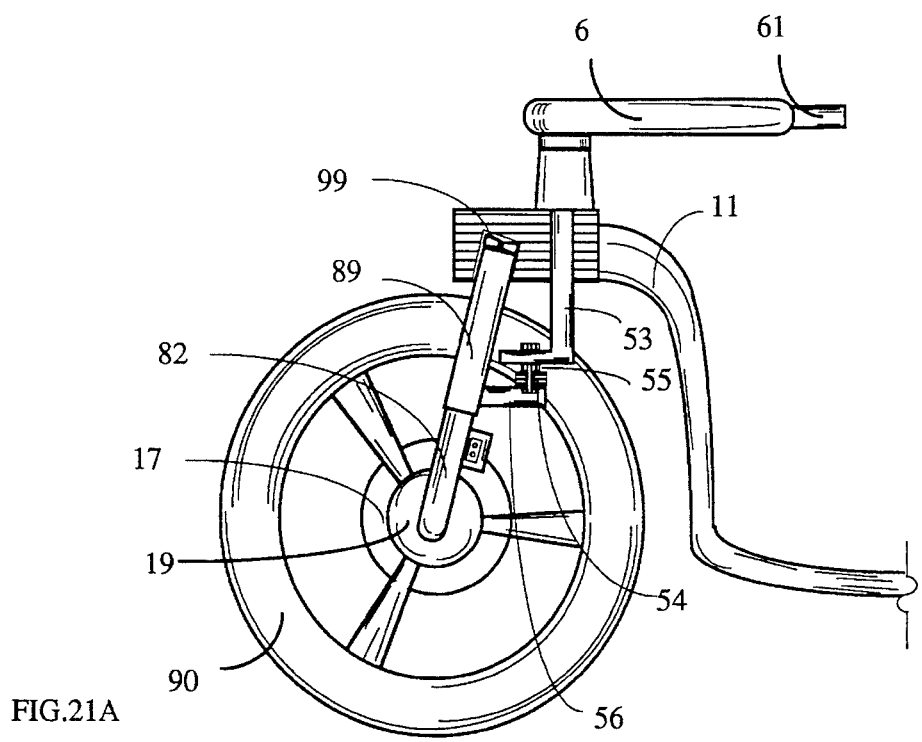
Figure 21B:
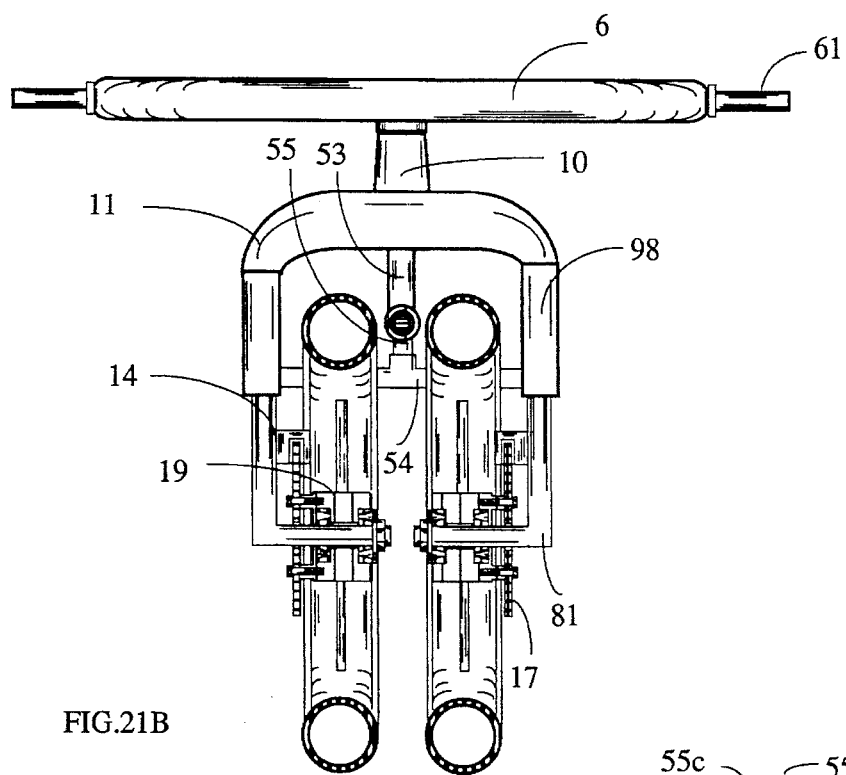
Figure 21C:
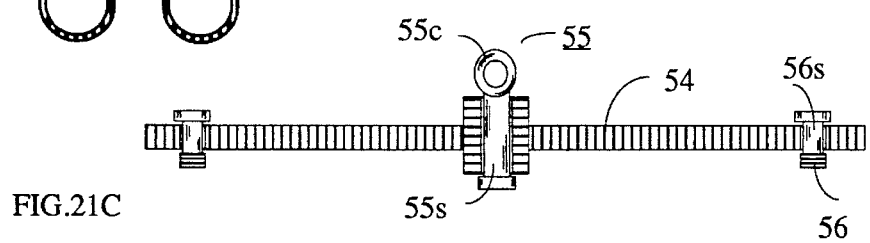

FIG. 21 (A) is the side elevational view of the front wheel, framework and the front fork with swing-upper-arm steering shock tube; (B) is the partial exposed front view of the front wheel, framework and the front fork with swing-upper-arm steering shock tube; (C) is the steering level for the upper-arm-steering shock tube.

Figure 22A:
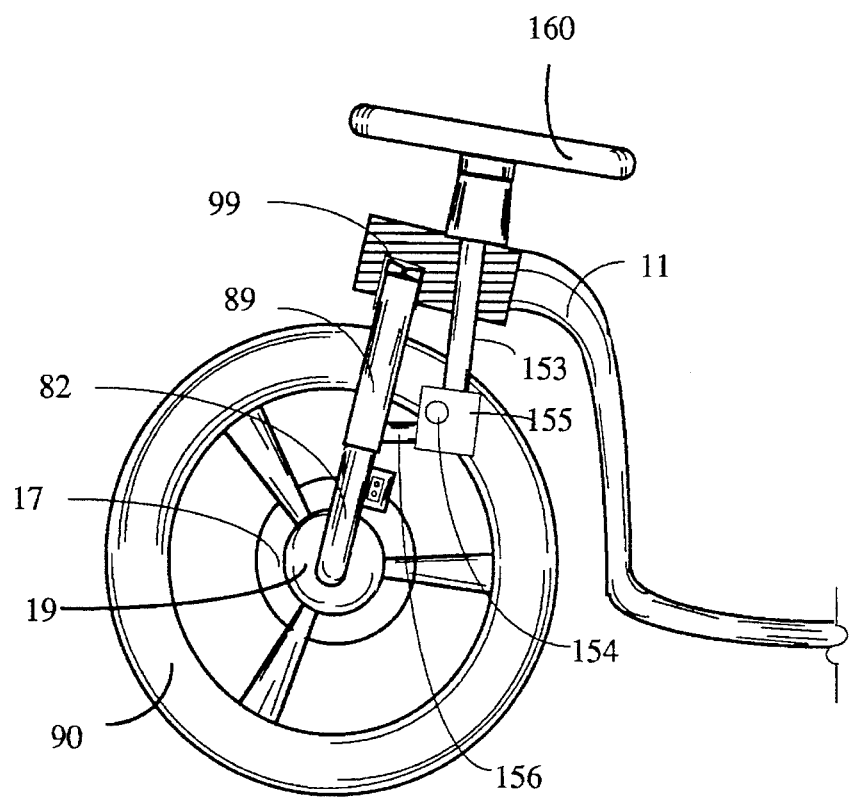
Figure 22B:
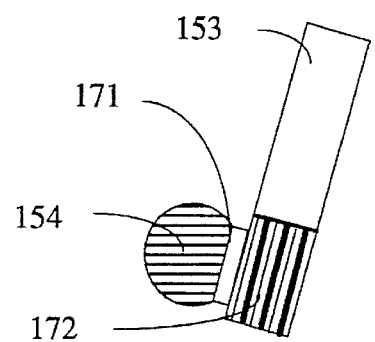

FIG. 22 (A) is the side elevational view of front fork equipped with the steering wheel and steering gears; (B) is the partial exposed view of the steering gears.

Figure 23A:
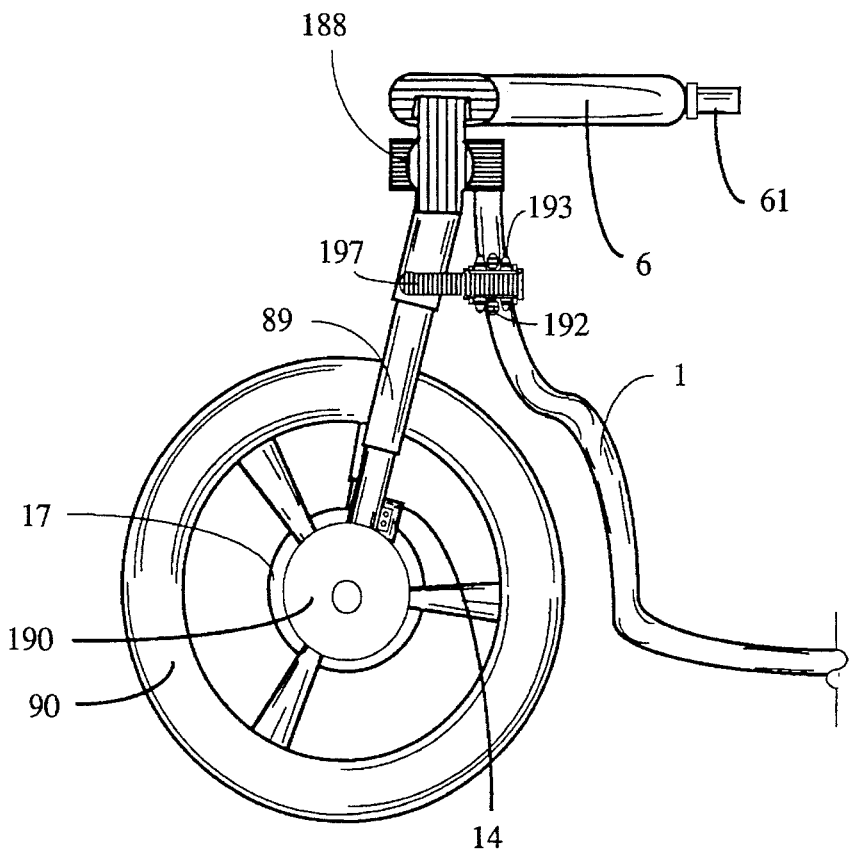
Figure 23B:
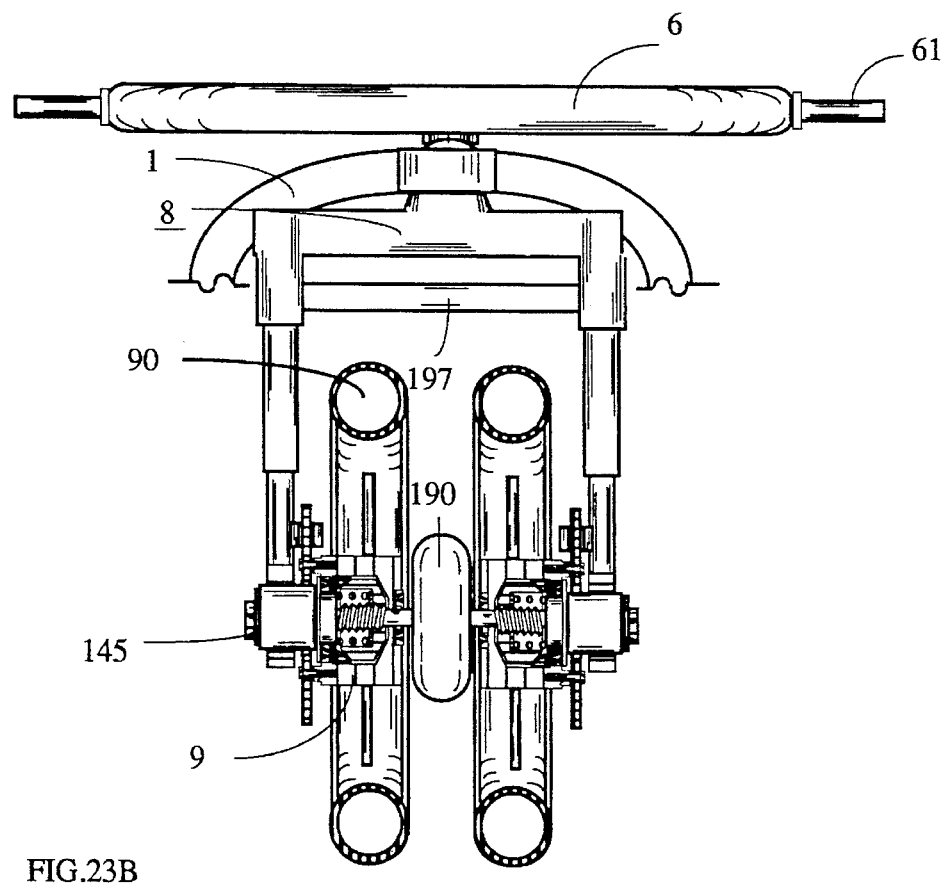

FIG. 23 (A) is the side elevational view of the front drive wheel mechanism; (B) is the partial exposed view of front drive wheel mechanism having the differential driving mechanism embedded inside the hub.

FIG. 24 is the basic operations of the screw engaging driving mechanism: (A) the drum shifts left as the right-handed screw rotates counter-clockwise; (B) the drum shifts right as the fight-handed screw rotates clockwise; (C) the drum shifts left as the right-hand drum rotates clockwise; (D) the drum shifts right as the right-hand drum rotates counter-clockwise.

Figure 25:
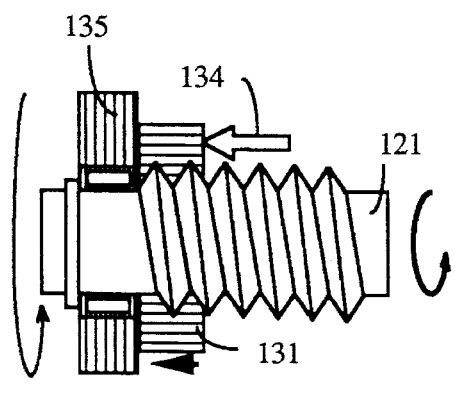

FIG. 25 is the engaging operation of the driving mechanism: the right-handed screw rotates counter-clockwise, the drum shifts left to engage with the left half hub on the left side of the drum and drives the left half hub to rotate counter-clockwise.

Figure 24A:
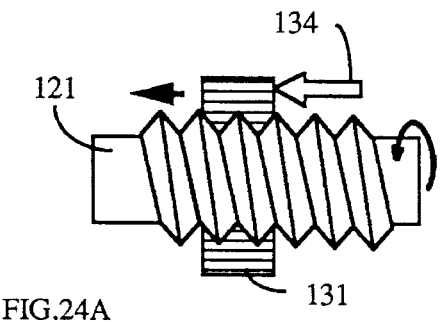
Figure 24B:
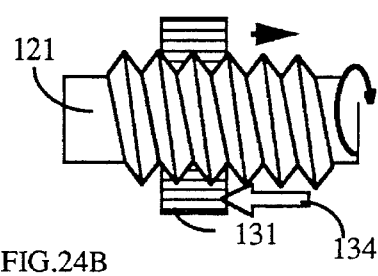
Figure 24C:
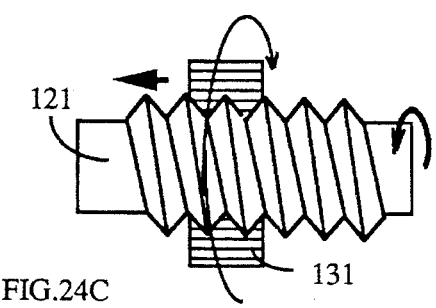
Figure 24D:
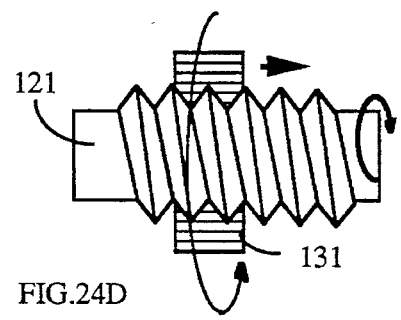
Figure 26:
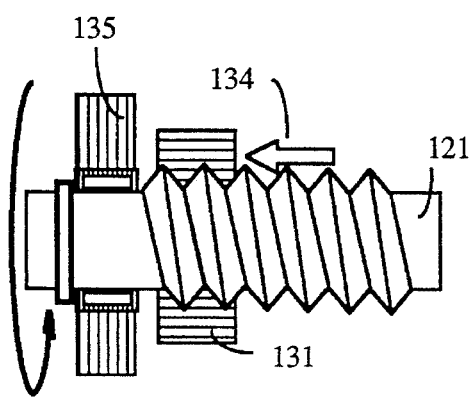

FIG. 26 the drum disengages the left half hub; the left half hub rotates counter-clockwise or the screw rotates clockwise as shown in FIG. 24D, the drum shifts right and disengages the left half hub.

FIG. 27 (A) the left half hub rotates to have the drum to disengage the left half hub; (B) the left half hub and screw rotate to have the drum to disengage the left half hub; (C) the screw rotates to have the drum to disengage the left half hub.

Figure 28:
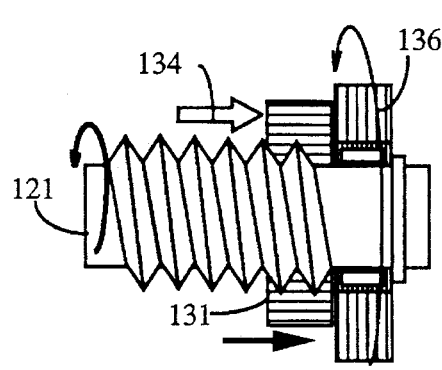

FIG. 28 shows the engaging operation of the driving mechanism: the right-handed screw rotates clockwise, the drum shifts right to engage with the right half hub on the right side of the drum and drives the right half hub to rotate clockwise.

Figure 29:
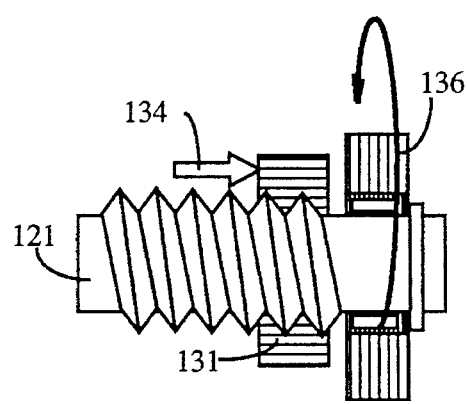

FIG. 29 the drum disengages the right half hub and the right half hub is free to rotate; the right half hub rotates clockwise or the screw rotates counter-clockwise as shown in FIG. 24C, the drum shifts left and disengages with the right half hub.

FIG. 30 (A) the right half hub rotates to have the drum to disengage the right half hub; (B) the right half hub and screw rotate to have the drum to disengage the right half hub; (C) the screw rotates to have the drum to disengage the right half hub; the drum is held by the lateral gripping force.

FIG. 31 is the combinatory hub of the left half hub as shown in FIG. 27 and the fight half hub as shown in FIG. 30 to have the equivalent wheel structure as shown in FIG. 5; (A) the axle rotates counter-clockwise to engage with the wheel on the left side and drives the hub to rotate counter-clockwise; (B) the hub rotates counter-clockwise to disengage the hub; (C) the axle rotates clockwise to engage with the hub on the right side to rotate clockwise; (D) the hub rotates clockwise to disengage itself.

FIG. 32 the hub is in the brake mode: (A) the axle rotates clockwise to lock the hub which rotates counter-clockwise; (B) the axle rotates counter-clockwise to lock the hub which rotates clockwise.

FIG. 33 is the state diagram to illustrate the transitions among the different operations of engaging driving mechanism.

FIG. 34 is the combinatory state diagram to illustrate the transitions among the different operations of two engaging driving mechanisms to generate the state diagram of the differential driving mechanism.

Figure 35:
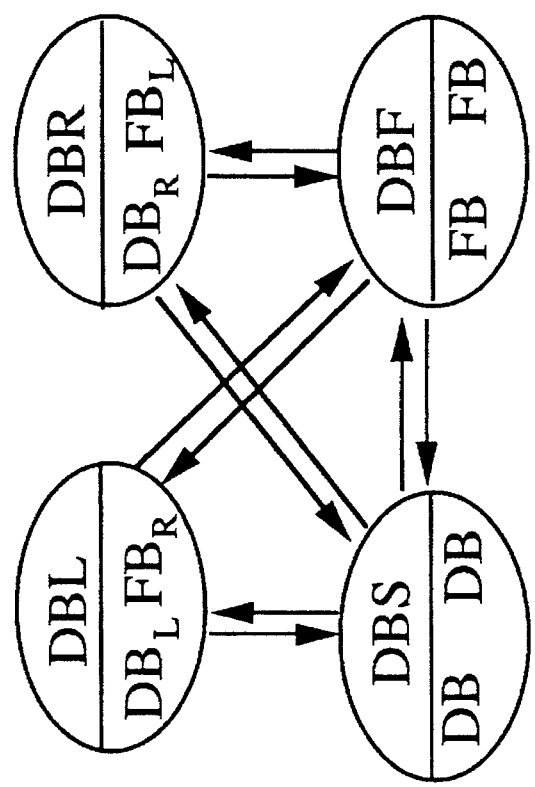
Figure 35:
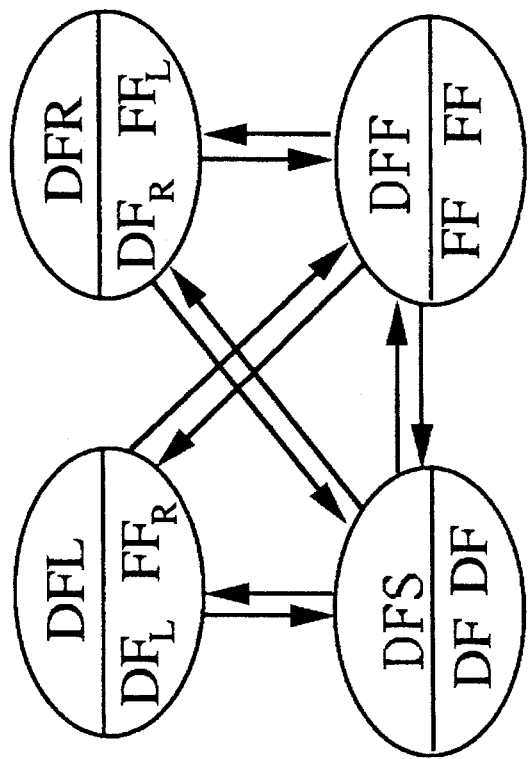

FIG. 35 is the state diagram to illustrate the transitions among the different operations of differential driving mechanism.

DESCRIPTION

Figure 1:
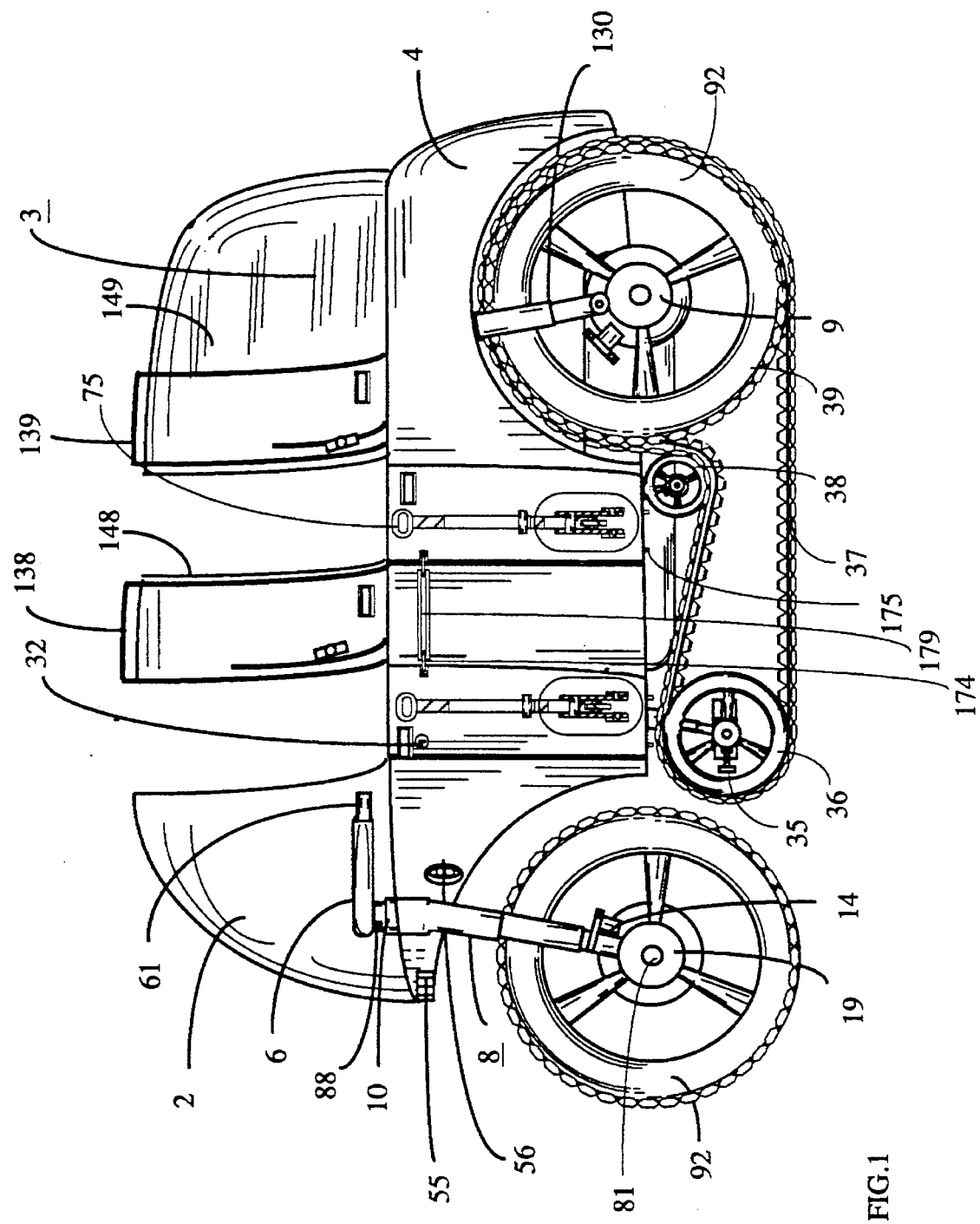
FIG. 1 is the motorcar equipped with the snow belts.
Figure 14A:
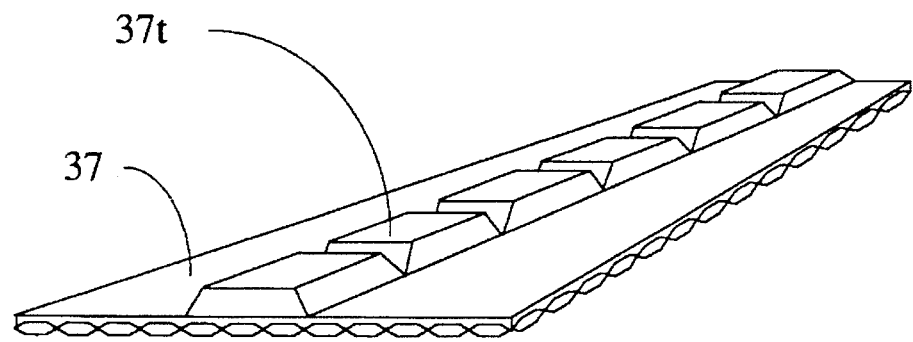
Figure 14B:
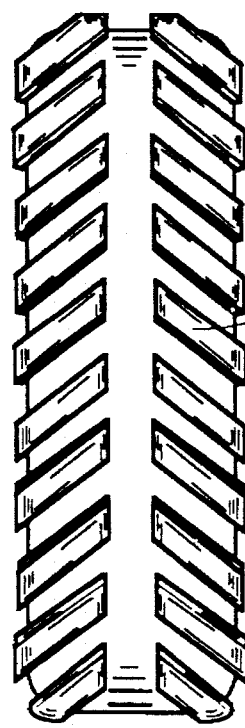
Figure 14C:
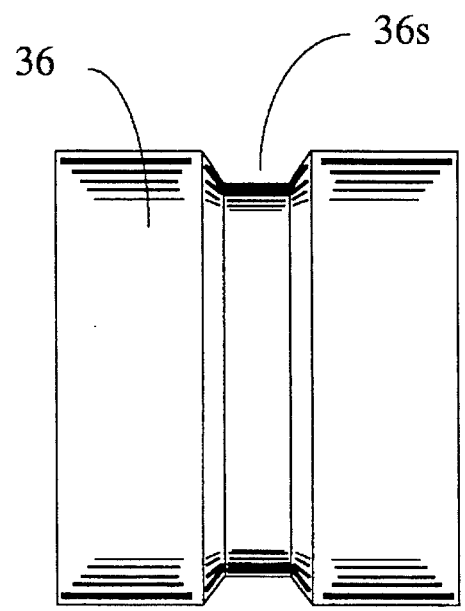

In this invention, I emphasize the system design of the whole motorcar. Any people who is familiar with the mechanism of motorcycle can implement it without any problem. The motorcar may ride in the snowy, icy or muddy road conditions. FIG. 1 shows the side view of motorcar. The motorcar has four wheels, two front twin wheels and two rear twin wheels. As shown in FIG. 2A, the twin wheel has two wheels aligned very close to each other. To have the clear picture, the snow belt and snow tire are replaced with the normal tires. In FIG. 1 and FIG. 9A, the bracket 10 holds the steering post 88. The steering post 88 tilts backward a little. The steering post 88 is integrated as an integrate unit with two single arm steering shock tubes 89 to be the front fork 8. Two single arm steering shock tubes 89 tilt backward with an angle. As the handlebar 6 swivels, the front twin wheels change the direction. The windshield 2 is transparent. On the fairing 20, there are air inlet 56. The motorcar may operate on the snow and muddy road. The motorcar is equipped with the snow belts 37 and tire 92. The snow belt 37 wraps around the rear wheel 92, the pully 38 and the tension wheel 36. Under the driving of rear wheel 92, the snow belt 37 rolls to push the motorcar to drive forward or backward. The tension of snow belt are adjusted with the tension wheel 36 and dangling pulley 38. The dangling pulley 38 is mounted beneath the motorcar. Adjusting the biasing screw 35, the bias screw 35 shifts the tension wheel 36 to adjust the tension of the belt 37. The belt 37 is in tension that the belt 37 enwraps the tension wheel 36 and driving wheel 92. The dangling pulley 38 squeezes the upper belt to wrap around the driving wheel 92. To keep the belt 37 enwrapping the wheels, as shown in FIG. 14A, there is a guided band 37t on the inner rim of the belt 37. Correspondingly, as shown in the FIG. 14B, the wheel 92 has a central slot. As shown in FIG. 14C, the tension wheel 36 has a central slot. Due to the differential drive mechanism as shown in FIG. 3, FIG. 4 and FIG. 5, during turning direction, the inner wheel pulls the snow belt 37 to rotate; the exterior snow belt 37 is free to run. This motorcar is adaptable to operate in a field having rough road conditions. All the complex differential mechanism is enveloped in the hub 9.

From the outside looking, the mechanism is very simple.

FIG. 2 is the top view of the frame of the motorcar. My motorcar has many special designs for the single arm cushion, steering and differential height mechanism. Single arm is one wheel use only one shock tube. One wheel uses two shock tube is twin-arm. Single arm front fork structure uses only two shock tubes twin-arm front fork structure uses four shock tubes. The front wheels are mounted on the single arm axles 81. The single arms 8 incline backward. Under the impact of road, each single arm 8 may vary its length separately and immediately to absorb impulse of road with the cushion mechanism.

As shown in FIG. 2 and FIG. 13, the engine 41 is beneath the front seat 21. As shown in FIG. 1 and FIG. 2, the air inlet 56, the air duct, engine 41, vaporizer, compressor 151 and fan 51 constitute the air conditioning and venting system for the motorcar. The transmission 12 lies across the front seat and rear seat. The brake caliper 14 clamps the brake disk 17 to brake the wheel.

Figure 2B:
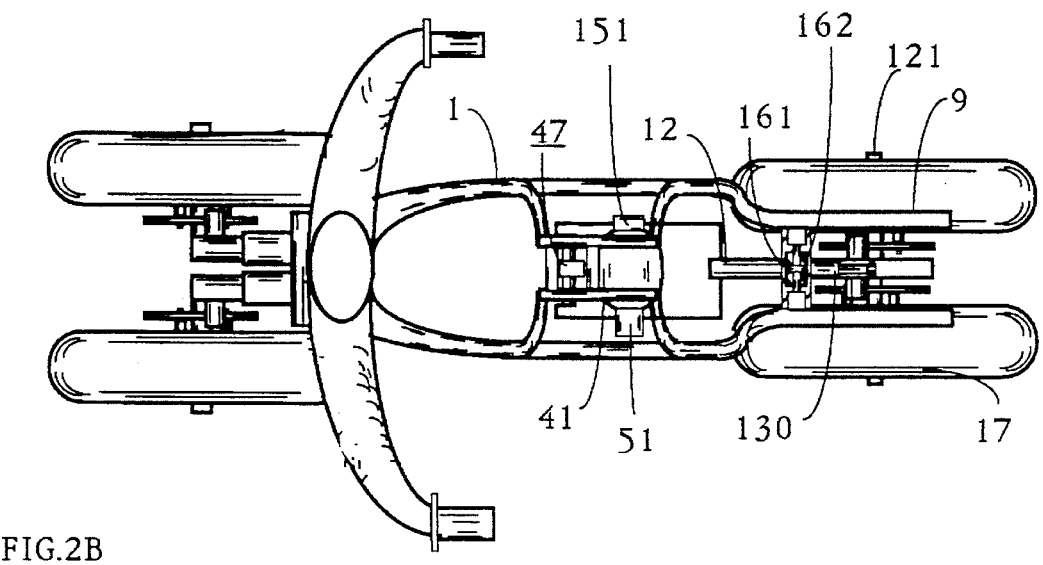

FIG. 2B is the different alignment of the wheels. The wheels is aligned outside the shock tube and the disk brake mechanism. The base in FIG. 2B is larger than the base in FIG. 2A. According FIG. 2B is more stable than FIG. 2A in lateral direction.

The differential speed mechanism enables the two wheels to have different rotation speeds during turning directions. However, as two wheels run in straight forward direction or in staright backward direction, the differential mechanism must have two wheels to rotate with the same speed. Otherwise, it is no more differential drive. Only one wheel driving forward or backward in straight line is one wheel drive, not two wheel differential drive. Single wheel drive is very dangerous at high speed. For the differential drive, during turning directions, the inner wheel rotates slower than the exterior wheel. The inner wheel still engages with the shaft 121 in the driving mode. The exterior wheel runs faster than the rotational speed of inner wheel and the shaft 121. The shaft 121 disengages the exterior wheel. The exterior wheel is in the free-running mode. So this wheel assembly is referred as the differential driving mechanism. My new differential mechanism has the free running mode. The conventional diffential mechanism of the automobile doesn't have the free running mode. Free running mode is very important for the economy of energy, i.e., save of the fuel. With the free running mode of my differential drive, we may cut the fuel consumption as lot. It is the unexpected results of my invention.

However, save fuel consumption with the free-running mode is not so easy task. In the prior arts, for high speed operation, the friction problem of Schmitz' vehicle drive becomes untolerable. It causes the mechanical part of friction finger broken. Original Schmitz' design is for toys. To solve the friction problem in the high speed motorcar design, I invent the noncontact gripping force engaging mechanism and the frictionless upper-bounded lateral gripping force engaging mechanism.

FIG. 3A shows the in-hub noncontact force differential mechanism. The differential mechanism mounted at the ends of the undivided continuous axle 121. The twin wheels may be aligned very close. The space between two wheels may be as small as the width of a pulley 70. The belt 71 pulls the pulley 70 to drive the axle 121 and the differential mechanism. FIG. 3B shows that half of the differential mechanism may be used as single wheel driving mechanism. FIG. 3C shows the poles 555 of noncontact force, such as magnetic force, to be embedded in the driving drum 131. FIG. 3D shows the poles 444 of noncontact force, such as magnetic force, to be embedded in the ear 126 of the still frame. FIG. 3E shows the poles 190 of noncontact force, such as magnetic force, to be embedded in the hub 19. The interaction between the poles 444 and 555 of noncontact force, the gripping force is generated. The gripping force is induced by the car 126 to grip the drum 131 still. FIG. 3F shows the distribution curve of the noncontact force; m is the number of poles. FIG. 3G is the working principle of the noncontact force differential mechanism. The wedge force 146 is the driving force that the drum 131 drives the hub 9 with the wedge force. The hub is filled with grease that the engagement and disengagement are very smooth. The force needs to hold the driving drum still is Fscrew. Fmax is maximum value of the gripping force. The gripping force grips the driving drum still until the driving drum engages with the hub. After engagement, the engaging wedging force Fwedge overcomes the gripping force Fmax to drive the hub 9 to rotate. To transform the axial squeezing force to be the radial engaging force, the drum has the cone shape 147. The wedge blocks 132 are inserted between the engaging drum 131 and the hub 9. As the shaft 121 rotates backward, the engaging drum 131 squeezes the wedge blocks 132 with the wedge force to engage with the hub 9.

Figure 4B:
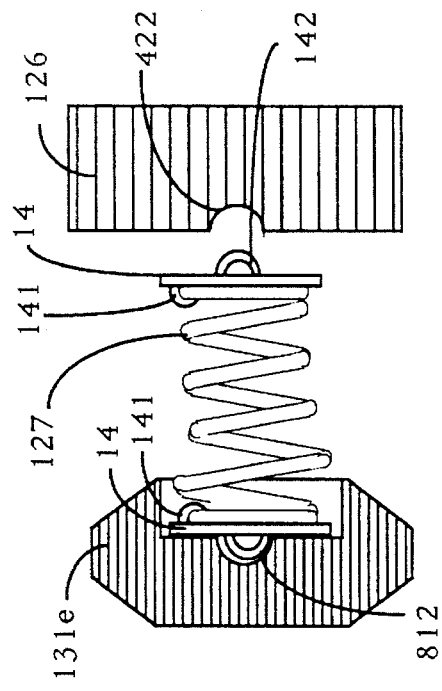
Figure 4A:
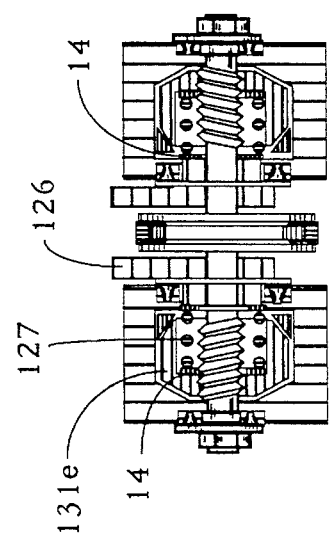
Figure 4E:
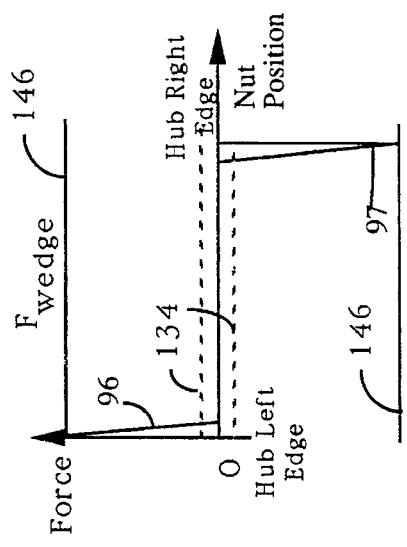
Figure 4D:
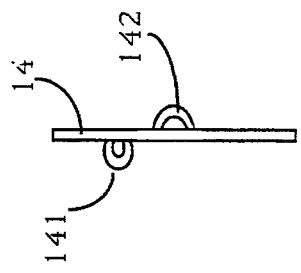
Figure 4C:
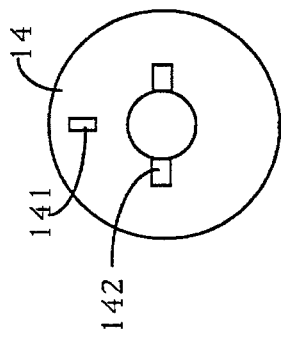

In FIG. 4A, it shows the lateral direction upper bound gripping force differential mechanism. In FIG. 4B, it shows the detailed structure of the gripping mechanism. The gripping spring 127 applying the gripping force 134 on the driving drum 131e. The gripper 14 grips the engaging drum 131 that the drum 131 can be shifted left and right as axle rotates. The protrude 142 fits in the hole 812 or 422 to apply the gripping force. The gripping spring 127 passes through the ear 141 to hold the gripper 14. The gripping spring 127 expands against the still frame 126 and the drum 131e to introduce the gripping force to the drum 131e. To adapt to the shift of drum 131, the gripping spring 127 adjusts its length to apply the gripping force to the drum 131e. FIG. 4e shows the principle of the lateral direction upper bound gripping force differential mechanism.

The principles of thedifferential speed mechanism are illustrated in the figures from FIG. 24 to FIG. 35. FIG. 24 illustrates the basic operations of shift mechanism. In the following description, the rotational directions are described as the directions seeing from the right and seeing into the paper. The lateral gripping force 134 holds the drum 131 still. The gripping force are shown by the forces 134 in FIG. 3G and FIG. 4E. Seeing from the right, as the right-hand screw 121 rotates counter-clockwise, the drum 131 shifts to left as shown in FIG. 24A. In FIG. 24B, as the screw 121 rotates clockwise, the drum 131 shifts to right. In FIG. 24C, the drum 131 rotates clockwise relative to the screw 121, the drum shifts to left. In FIG. 24D, the drum 131 rotates counter-clockwise relative to the screw 121, the drum 131 shifts to right. From FIG. 25 to FIG. 32, the above basic operations of shift mechanism are further extended to be the driving operations to drive the hub 9.

In the following descriptions, the left hub 135 is held not to move in the lateral direction. The screw is knotched on the shaft 121. In FIG. 25, as the nut 131 shifts to left in the same way as the drum 131 does in FIG. 24A, the drum 131 squeezes the left half hub 135 and engages with the left half hub 135. As shown in FIG. 3G and FIG. 4E, during engagement, the wedge force 146 overcomes the gripping force 134 to drive the left hub 135 to rotate. Under the counter-clockwise rotational driving force of shaft 121, the left hub 135 has to rotate counter-clockwise.

FIG. 26 shows the nut 131 disengages the left half hub 135. There is one gap between the left half hub 135 and the drum 131. The left hub 135 is free to rotate. There are three ways to have the disengagement as shown in FIG. 27.

Figure 27A:
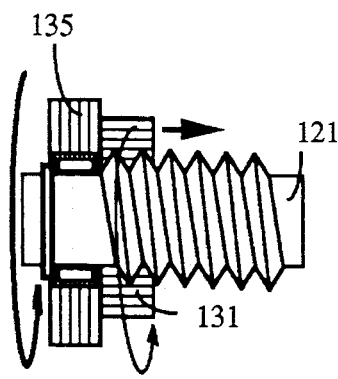

In FIG. 27A, the left half hub 135 rotates counter-clockwise; the shaft 121 is held still. At beginning, the drum 131 engages with the left half hub 135. As the left half hub 135 rotates counter-clockwise, the drum 131 rotates together with left half hub 135. According to FIG. 24D, the drum 131 rotates and shifts right to disengage the left half hub 135 as shown in FIG. 26. The left half hub 135 is free to run.

Figure 27B:
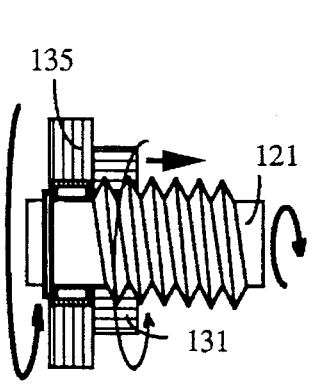

In FIG. 27B, the nut 131 engages with the left half hub 135. The left half hub 135 rotates counter-clockwise and the screw 121 rotates clockwise. As the left half hub 135 rotates counter-clockwise, according to FIG. 24D, the nut 131 shifts right and disengages with the left half hub 135 as shown in FIG. 26. The left half hub 135 is free to run.

Figure 27C:
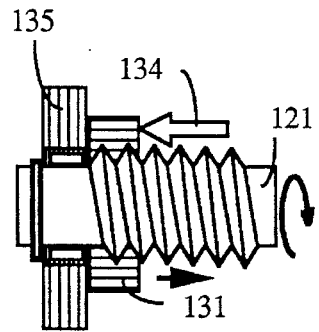

In FIG. 27C, the left half hub 135 is still; the drum 131 is held still by the gripping force 134. At beginning, the drum 131 engages with the left half hub 135. As the screw 121 rotates clockwise, according to FIG. 24B, the drum 131 shifts right and disengages left half hub 135 as shown in FIG. 26. The left half hub 135 is free to run.

FIG. 28 is the conjugate case of FIG. 25; FIG. 29 is the conjugate case of FIG. 26; FIG. 30 has the conjugate cases of FIG. 27.

In FIG. 28, the right half hub 136 is held not to move in the lateral direction. As the drum 131 shifts to right as the same way in FIG. 24B, the drum 131 squeezes the right half hub 136 and engages with the right half hub 136 to be one unit. As shown in FIG. 3G and FIG. 4E, during engagement, the wedge force 147 overcomes the gripping force 134 to drive the right half hub 136 to rotate. Under the clockwise rotational driving force of screw 121, the right half hub 136 has to rotate together with the drum 131 and the shaft 121.

FIG. 29 shows the drum 131 disengaging with the right half hub 136. The right half hub 136 is free to rotate. There is one gap between the right half hub 136 and the drum 131. As shown in FIG. 30, there are three ways to have the disengagement.

Figure 30A:
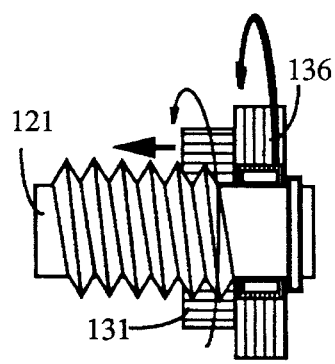

In FIG. 30A, the drum 131 engages with the right half hub 136; the right half hub 136 rotates clockwise; the screw 121 is held still. As the right half hub 136 rotates clockwise, according to FIG. 24C, the drum 131 shifts left and disengage as shown in FIG. 29. The right half hub 136 is free to run.

Figure 30B:
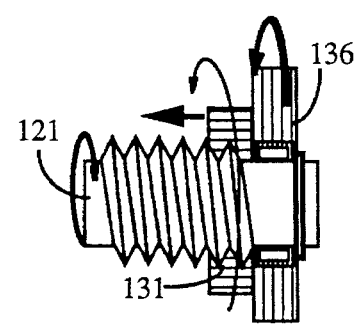

In FIG. 30B, the right half hub 136 rotates clockwise; the drum 131 engages with the right half hub 136; the screw 121 rotates clockwise. As the right half hub 136 rotates clockwise, according to FIG. 24C, the drum 131 shifts left and disengages with the right half hub 136 as shown in FIG. 29. The right half hub 136 is free to run.

Figure 30C:
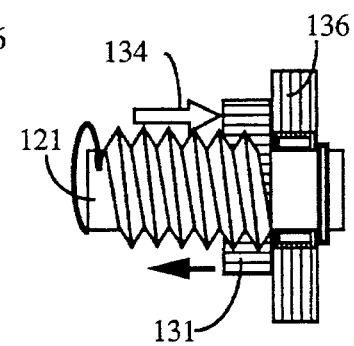

In FIG. 30C, the drum 131 engages with the right half hub 136; the screw 121 rotates counter-clockwise; the drum 131 is held still by the gripping force 134. According to FIG. 24A, the drum 131 shifts left and disengages with right half hub 136 as shown in FIG. 29. The right half hub 136 is free to run.

Furthermore, as shown in FIG. 31, the left half hub 135 and right half hub 136 are merged to be a single hub 9. In FIG. 25, the left half hub 135 is driven to rotate counter-clockwise; in FIG. 28, the right half hub 136 is driven to rotate clockwise. In FIG. 26 and FIG. 29, the left half hub 135 and right half hub 136 are free to run. So the hub 9 is able to drive clockwise, counterclockwise and free to run.

These three basic operations can be used as the modes of forward drive, backward drive, free-run, speed-up, deceleration and brake.

Figures 31A, 31B, 31C, 31D:
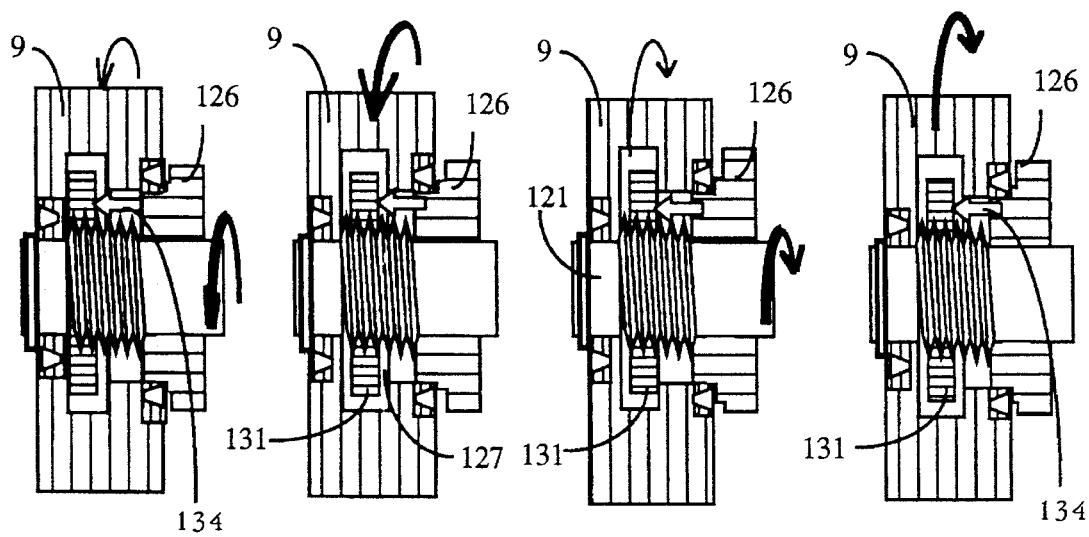

Similar to FIG. 25, in FIG. 31A, the shaft 121 rotates counter-clockwise. The drum 131 shifts left to engage with the hub 9 at the left side of nut 131. The drum 131 squeezes the hub 9 and locks the hub 9. As shown in FIG. 3G and FIG. 4E, the engaging wedge force 146 overcomes the gripping force 144. The shaft 121 drives the drum 131 and hub 9 to rotate counter-clockwise.

In FIG. 31B, the hub 9 rotates counter-clockwise. However, the shaft 121 is held still. Similar to FIG. 26, the drum 131 disengages the hub 9 and the hub 9 is free to run.

As shown in FIG. 3G and FIG. 4E, the wedge force 146 decreases with the clockwise rotation of hub 9. As shown in FIG. 27A, the drum 131 shifts left and disengages with the hub 9. The gripping force 134 holds the drum 131 still. The hub 9 is free to run. If the shaft 121 starts to rotate counter-clockwise, as shown in FIG. 31A, the wheel will be driven to rotate counter-clockwise again. This is the accelerate mode.

In FIG. 31C, the shaft 121 rotates clockwise. According to FIG. 24B and FIG. 28, the drum 131 shifts right and engages with hub 9. The hub 9 is locked with the drum 131. As shown in FIG. 3G and FIG. 4E, the engaging wedge force 147 overcomes the gripping force 134 applying on the drum 131. The shaft 121 drives the drum 131 and hub 9 to rotate clockwise.

FIG. 33 shows the state diagram of the engaging mechanism. DF is the state of driving forward as shown in FIG. 31A; FF is the forward free-running mode as shown in FIG. 31B; DB is the driving backward mode as shown in FIG. 31C; FB is the backward free-running mode as shown in FIG. 31D; BF is the braking mode in the forward running as shown in FIG. 32A; BB is the braking mode in the backward running as shown in FIG. 32B.

At beginning, as shown in FIG. 31C, the drum 131 engages with the hub 9 and is locked to the hub 9. As the hub 9 rotates clockwise and the shaft 121 is held still as shown in FIG. 31D, the drum 131 disengages with the hub 9.

FIG. 31A is the mode of forward driving. FIG. 31C is the mode of backward driving. FIG. 31B is the forward free-running mode. FIG. 31D is the backward free-running mode. With the cyclic operations of FIG. 31, the hub 9 may be driven forward, backward and free to run.

The direct transition from FIG. 31A to FIG. 32A is the brake mode in the forward driving. The shaft 121 is held still and the drum 131 is self-locked with hub 9. If the shaft 121 still has the damping force in the backward direction, it is in the decelerate mode.

The direct transition from FIG. 31C to FIG. 32B is the brake mode in the backward driving. The shaft 121 is held still, the drum 131 is self-locked with hub 9. If the shaft 121 is under the damping force in the forward direction, it is in the decelerate mode. In the decelerate mode and brake mode, the hub 9 is self-locked to the drum 131 and the shaft 121. For this self-locked mechanism, the braking force is coming from the self-locking force. In FIG. 32A, the hub 9 is self-locked in backward rotation. The hub 9 may continuously run forward. In FIG. 32B, the hub 9 is self-locked in forward rotation. The hub 9 may continuously run backward. With these basic operations, the motorcar can have the modes of driving forward, driving backward, free to run, decelerate and brake.

In FIG. 34, as two wheels working together, there are different combinations. The differential speed mechanism adopts the novel design of engaging mechanism such that it has a lot of novelties. As one wheel is in drive forward mode(DF) and one wheel in free forward running mode(FF), it is driving forward and turning directions(FT). As one wheel is in drive backward mode(DB) and one wheel in free backward running mode(FB), it is driving backward and turning directions(BT). The new modes also two different states of right turn and left turns.

Two wheel differential drive is completely different from the operation of single wheel. My invention illustrate another example of a simple idea generating a great invention. FIG. 35 shows the state diagram for the differential drive. The state diagram of the differential drive in FIG. 35 is completely different from the state diagram in FIG. 33. Drive forward left turn(DFL) is left wheel driving forward-(DFL) and right wheel free running(FFR); drive forward right turn(DFR) is right wheel driving forward(DFR) and left wheel free running(FFL); drive straight forward(DFS) is to have both wheel drive forward(DF); free running forward(FF) is to have both wheel free running forward(FF); drive backward left turn(DBL) is left wheel driving backward(DBL) and right wheel free running(FBR); drive backward right turn (DBR) is right wheel driving backward-(DBR) and left wheel free running(FBL); drive straight backward(DBS) is to have both wheel drive backward(DB); free running backward(BF) is to have both wheel free running backward(FB). The arrows show the transtions among the different states of the differential drive.

Figure 5A:
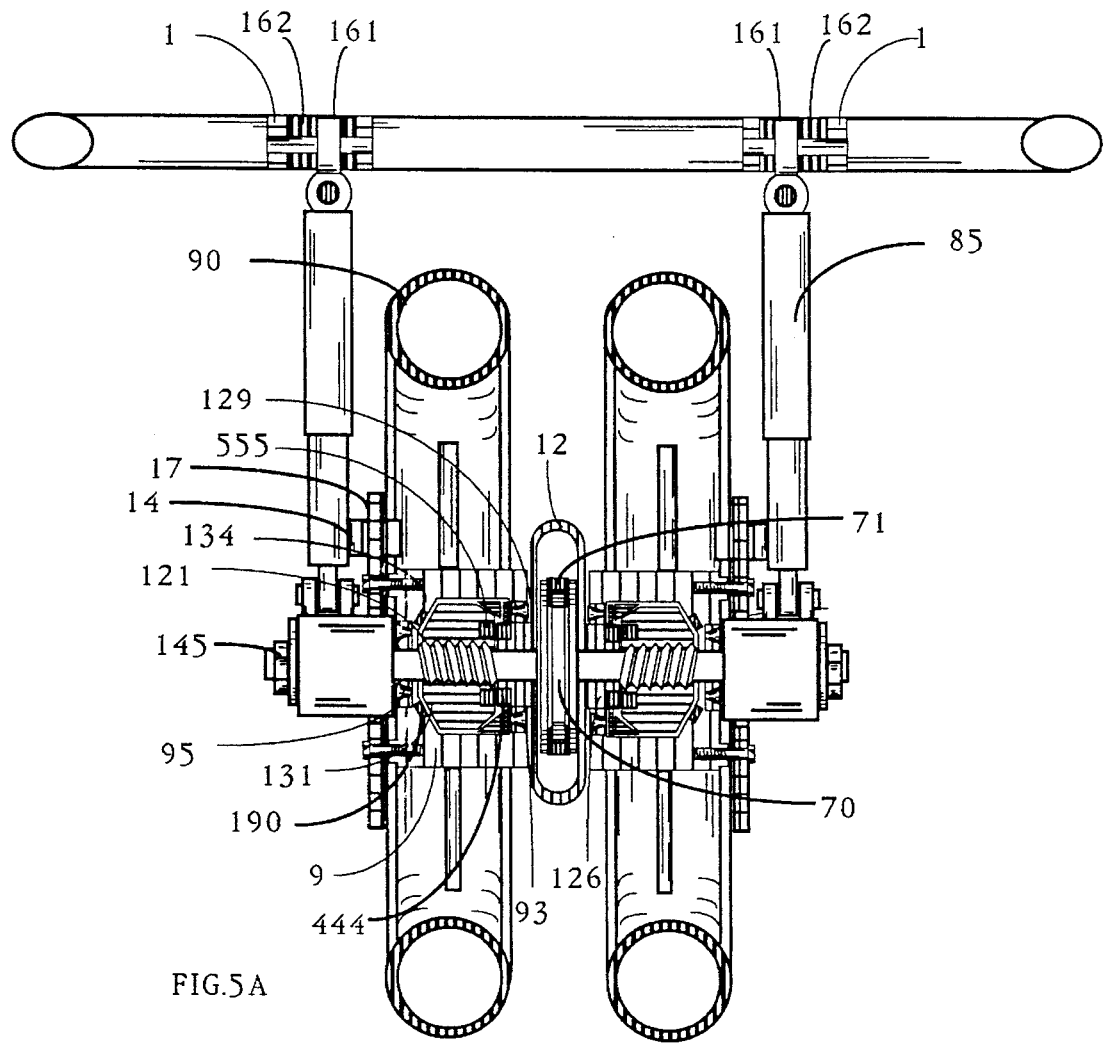
Figure 5B:
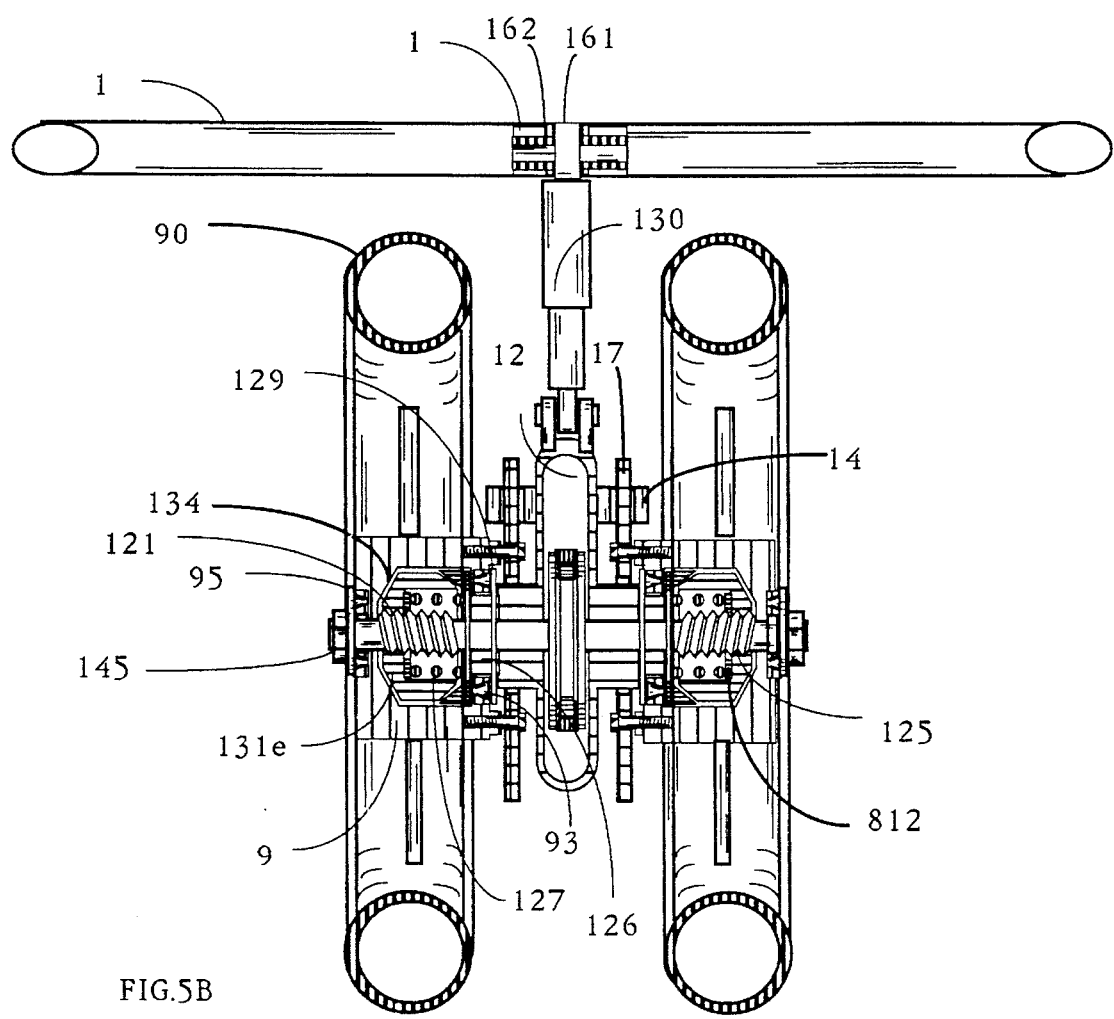

To drive the rear wheels with different speeds, inside the hubs 9 of rear wheels 90, there are the differential driving mechanism. The differential drive mechanism is embedded in the hub 9 to reduce the car width. The differential drive mechanism is implemented with the engaging mechanism embedded in the hub 9 separately. In FIG. 5, the above novel designs are applied to the driving wheel design. FIG. 5 is the elevational view of the rear wheels, framework and the partial exposed view of the rear hub 9. FIG. 5A is the section view taken at the rear wheels in FIG. 2A; FIG. 5B is the section view taken at the rear wheels in FIG. 2B. In FIG. 5, the hub 9 is rotationally mounted on the rear axle 121 with bearings 93 and 95. The ear 126 is the extension of the transmission case 12. The driving drum 131 rotationally mounts on the driving screw 121. During the turning direction, two driving wheels 90 have to rotate at different speeds. FIG. 6 is an illustrative example of the driving mechanism for the undivided axle 121. There is no differential drive mechanism in the transmission box 12. The differential mechanism of motorcar is embedded in the hub. In FIG. 5, the rear wheels 90 are driven by the belt 71 having a very narrow space. As shown in FIG. 5 and FIG. 13, this transmission mechanism can be a chain or belt 71 to pull the axle 121 to rotate wheel 90. The belt 71 pulls the pully 70 to rotate the rear axle. The mechanism is so simple that we can reduce the width of motorcar. It makes the motorcar width as small as the width of twin wheels. FIG. 5A has the noncontact force differential mechanism embedded inside the hub 9; FIG. 5B has the lateral upper-bounded gripping force differential mechanism embedded inside the hub. The axle of shaft 121 has the shift screws 125. With the locking nut 145, the bevel bearings 93 and 95, the hub rotationally mounts on the axle 121. The shift screw 125 shifts the driving drum 131 to engage or disengage with the hub 9. In the engaging position, the engaging drum 131 squeezes the hub 9 with the wedging forces 134 to be self-locked. The wedges 132 and 134 transform the axial direction squeezing force to be the radial direction engaging force. To be manufacturable, as shown in FIG. 7, the wedge blocks 132 are multiple segments of rim.

The working principles have been shown in the figures from FIG. 24 to FIG. 35. As the shaft 121 counter-clockwise rotates to drive the hub 9 to rotate forward, the shift screw 125 shifts the drum 131 until it squeezes the hub 9. In the squeezing engagement, the shaft 121 drives the hub 9 to rotate. Holding the shaft 121 still, the forward rotation of the hub 9 releases the lock between the hub 9 and the drum 131. The hub 9 can rotate freely in the disengagement position. The motorcar is free to run without making any noise.

As the shaft 121 rotates in the reverse direction, the shift screw 125 shifts the engaging drum 131 to squeeze the hub 9 on the inner side. The wheel rotates to drive the motorcar backward.

As shown in FIG. 31 and FIG. 32, the reverse rotation of shaft 121 may be used to brake the motorcar in the forward driving and vice versa. As the hub 9 is in the forward rotation, the reverse rotation of the shaft 121 disengages the driving drum 131 first as shown in FIG. 31B. Similar to FIG. 32A, the reverse rotation of the shift screw 125 shifts the engaging drum 131 to engage the hub 9 on the inner side. The engaging drum 131 engages and locks the hub 9. Referring to FIG. 33, the wedging force 146 overcomes the gripping force 134 and drives the hub 9 to rotate in the reverse (clockwise) rotational direction. As the hub 9 is in the backward (clockwise) rotation, the reverse (counter-clockwise) rotation of the shaft 121 disengages the engaging drum 131 first as shown in FIG. 31D. The gripping force 134 holds the engaging drum 131 still. Similar to FIG. 32B, the reverse (counter-clockwise) rotation of the shift screw 125 shifts the engaging drum 131 to engage the hub 9 on the outer side of the driving drum 131. The driving drum 131 engages and locks the hub 9. Referring to FIG. 33, the wedging force 146 overcomes the gripping force 134 and drives the hub 9 to rotate in the reverse (counter-clockwise) direction. In FIG. 33, the reverse rotation serves as the brake and the decelerate means for the motorcar in the sliding condition on the icy road.

In FIG. 9, they show the detailed structure of the front wheel. The single arm structure allows these two arms 89 to expand and shrink separately. In each single arm, the cushion not only absorbs the shock, but also adjusts its length to have differential height mechanism. The disk brake 17 is adopted as one illustrated example. The caliper 14 is attached to the lower arm 81. The bracket 10 of frame 1 holds the steering post 80 rotationally and is supported by the front fork 8. The front fork 8 adopts single-arm design. Each arm has one steering shock tube only. The front wheel 90 rotationally mounted on the horizontal axle 81. These two axle 81 don't connect to each other that each arm 81 may vary its length independently. The lower arm 81 has only the up-and-down sliding motion. The lower arm 81 cannot rotate relative to the upper arm and fork. So the steering shock tube needs special design. The conventional shock arm cannot be used on the single arm fork. The steering post 88 inclines backward slightly. Even in the standing still position, it offers the recovering force to return the front wheel 90 to point in the forward direction. During the right turning, the right arm 89 shrinks a little bit; the left arm 89 expands a little bit. The right arm 89 is under larger pressure. It pushes the handlebar 6 to return to the neutral forward position. During the left turning, the left arm 8 shrinks a little bit; the right arm 8 expands a little bit. The left single arm 89 is under larger pressure. It pushes the handlebar 6 to return to the neutral forward position. The detailed mechanism analysis are illustrated in FIG. 11 and FIG. 12.

In FIG. 10, the single arm steering shock absorber 89 is different from the conventional shock tube. The steering shock tube has functions of steering, differential height and cushion. The conventional shock tube has only the function of cushion. Accordingly, the design of steering shock tube is different from the conventional shock tube. It is noted that the shock tube and steering mechanism of conventional car are separated from each other. Here we use special fork designs that we can integrate the steering mechanism with the shock mechanism. It is a warning that my invention is a complete system design. The steering post 80 is an integrated unit with the upper portions of two single arms 89. The steering post 88 is almost vertical; the axle of steering post 88 just tilts backward slightly. The rider turns the handlebar 6 to rotate the steering post 88 to change the direction of front twin wheels. This tilt of the axle of steering post 88 is to keep the the front wheel pointing foward in the natural position. During the turning direction, the front wheels 90 have the tendency to return to the natural position.

FIG. 10 illustrates the detailed design of the steering shock tube. The lower cylinder 81 slides inside the upper cylinder 89. The stub 73 slides inside the slot 72 to have the low cylinder 81 to rotate as the upper cylinder 98 rotates. Between the lower cylinder 81 and the upper cylinder 89, there are a bearing cylinder 67. The coil springs 68 and 69 expand against the lower cylinder 81 and the upper cylinder 89. The outer cylinder 89 is filled with the oil 59. The oil ring 49 keeps the oil from leakage. The air compression houses 189 and 289 have the air pressure adjusted for the shock impact. As the shock impacts, the oil 59 flows through the dissipation hole 167 to dissipate the impact shock energy into heat. The screw 168 is to seal the oil passage.

As shown in FIG. 11, it shows the mechanism of the steering. The front wheels point forward (points out of the paper). The disk 91 is the horizontal plane passing through two axles 81. The bracket 10 corresponds to the bracket 10 of frame in FIG. 9. The axis 81 corresponds to the horizontal shaft 81 in FIG. 9. The bracket axis 10 tilts backward with a small angle. In FIG. 11B, the front wheel turns left. The disk 92 passing through axle 81 has an angle relative to the horizontal disk 92. To have both axles 81 lie in the horizontal plane, in FIG. 11C, the left arm needs to shrink; the right arm needs to extend. The shock absorber 89 deforms and the energy is stored in the shock absorber 89. After the steering, the shock absorber 89 will expand to force the front fork 8 returning to the natural position. The front wheel will point to the forward direction automatically and the motorcar will run straight forward again. Similarly, in FIG. 11D, the front fork is turning fight. In FIG. 11E, the right arm needs to shrink; the left arm needs to expand.

Figure 12A:
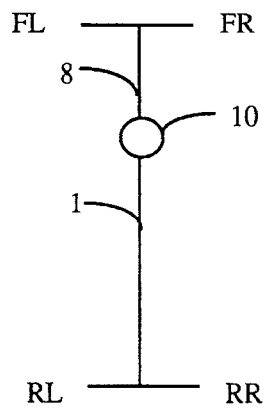
Figure 12B:
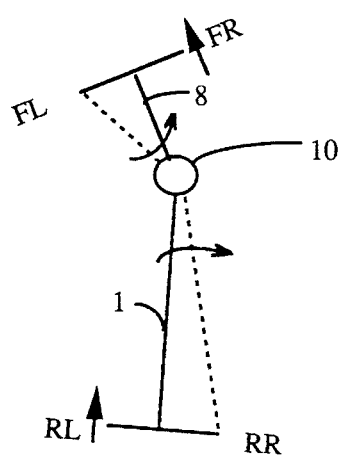
Figure 12C:
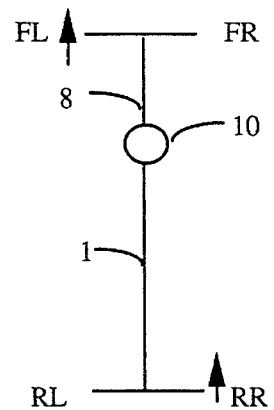

There is a design trade-off between the inclination angle of the axis 88, the deformation of shock absorber 89. If the inclination angle of truck 10 is zero, the deformation of shock absorber is zero. If the inclination angle of axis 10 is too large, the front fork is difficult to rotate. With a proper design trade-off of the inclination angle of the axis 80, the restoring force of the shock absorber 89 will restore the front fork back to the straight forward position after steering. The steering post 88 only tilts backward slightly that the shrinkage and expansion of the two single arms are very little. Turing the handlebar 6 right and left, the motorcar may crawl forward like the snake does. It makes the operation in the narraw parking space much easier. Furthermore, with the fork bending a little, the motorcar has the unexpected result which the two wheel motorcycle doesn't have. Turning the handlebar 6 right or left, the motorcar may move forward and sideward. It has a very important application to operate in the narrow parking space. FIG. 12 illustrates the operation of this mechanism. As the transmission system 12 engages in the forward drive, the rear wheel can only run forward. In FIG. 12A, the motorcar is in the normal position, the front wheels point forward. In FIG. 12B, the motorcar turns left. The front-left wheel FL has more friction than the front-right wheel FR. The front right wheel FR will rotate forward and the wheel FL will almost stay in the original place. Relatively speaking, the FL is the center and FR rotates on the circle. The joint 10 of steering post 88 will pull the rear frame 1 to rotate right accordingly. In forward drive, the rear right wheel RR cannot rotate backward. Relatively speaking, the RR is the center and RL rotates forward on the circle. As the handlebar swivels back to the neutral position, in FIG. 12C, the rear-left wheel RL is the center; the rear-right wheel RR rotates forward. The joint 10 of steering post pushes the front fork 8 forward.

Figure 12D:
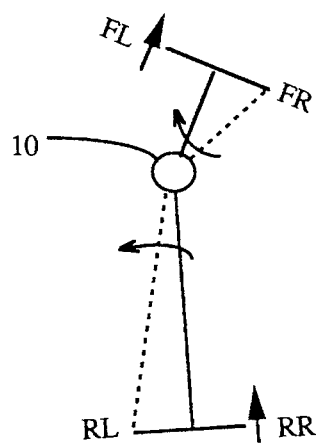
Figure 12E:
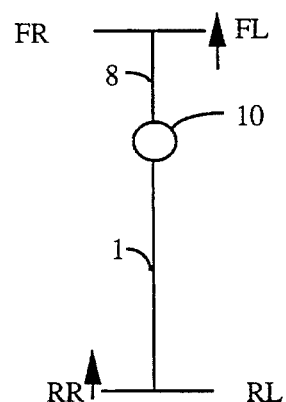

In FIG. 12D, the motorcar turns right. The front-right wheel FR has more friction than the front-left wheel FL. The wheel FL will rotate forward and the wheel FR will almost stay in the original place. Relatively speaking, the FR is the center and FL rotates on the circle. The joint 10 of steering post pulls the rear frame 1 to rotate left accordingly. The rear left wheel RL cannot rotate backward. Relatively speaking, the RL is the center and RR rotates forward on the circle. As the handlebar swivels back to the neutral position, in FIG. 12E, the rear-right wheel RR is the center; the rear-left wheel RL rotates forward. The joint 10 of steering post pushes the front fork 8 forward.

The motorcar can raise up the wheels on one side. Similar to the airplane, takeoff and landing are the most difficult art. Raising up the wheels and landing the wheel smoothly are very important design. My motorcar has the special design to make the transitions among four-wheel drive, three-wheel drive and two-wheel drive be very smooth. Four-wheel drive is to have all four wheel contacted with the ground. Three wheel drive is to have two front wheels and one rear wheel contacted with the ground. Two wheel drive is to have one front wheel and one rear wheel contacted with the ground. No other vehicle has such kind an operating style: transitions among four-wheel drive, three-wheel drive and two-wheel drive. To have the smooth transition, I invented the unique soft tilt and the soft landing with the combination of cushion, yoke, pivot joint and shock tube. The soft tilt and soft landing need the cooperation of both the front wheels and rear wheels. Tilting on one side, one side wheel can raise up to have single side wheel driving. To make the smooth riding, the front wheels have the differential height mechanism; the rear wheels have the resilient pivot joint to make the smooth transition between the tilt and raising up wheels.

FIG. 13 is the side view of the rear wheel and framework. The frame 1 is pivotally supported by the resilient joint of a shock absorber 130. The engine 41 is under the front seat. Between the front seat and rear seat, there is one open space for the legs of rear rider. As shown in FIG. 13C, the chair 21 may lie down to constitute a saddle seat.

Figure 8A:
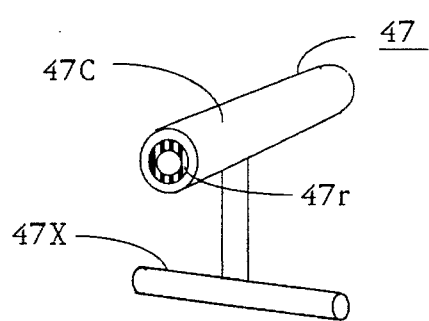
Figure 8B:
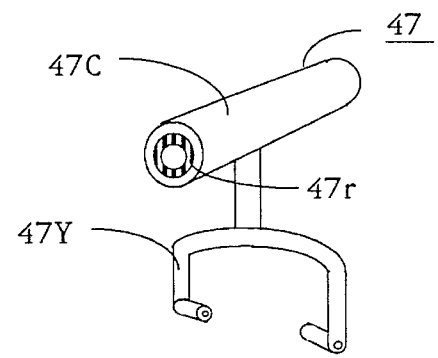

The shock absorber 130 supports the rear portion of the frame 1. The rear portion of transmission case 12 is supported by the rear axle 121. The front portion of transmission case 12 is pivotally supported by the frame 1 with the resilient pivot joint of yoke 47 as shown in FIG. 8A or the resilient pivot joint of yoke 47 as shown in FIG. 8B. 47r is the resilient cylinder for cushion. Due to the narrow space between twin wheel, the tilt of front frame is limited to a small angle then follow up by the single side wheel raising up. The raise-up and land down the wheels must be very smooth transition. The shock tubes and the resilient pivot joint 47 serve as the transition process.

In FIG. 5, during tilting, the cylinder 161 compress the resilient block 162. In FIG. 5A, the resilient block 162 is a cylinder. In FIG. 5B, the resilient block 162 is a cylinder with flange. In FIG. 5B, there is only one shock tube. Under the confinement of the open space of the frame 1, the resilient block 162 will allow a small tilt angle.

As the tilt angle is larger than the confinement, the single side wheels will be raised up.

As shown in FIG. 13, the front portion of frame 1 is supported by the front fork 8 having two single arms 89. The frame 1 has three support points, two single arms 89 and one rear shock absorber 130. FIG. 13B and FIG. 13D show the mechanism of the frame 1. The pivot joint 47J is corresponding to the yoke 47 in FIG. 8. The dotted lines show the front shock tubes 89 and the rear shock tube 130. The two front shock tubes 89 and the yoke joint 47J forms a triangle frame supported on the rear shock tube 130. As shown in FIG. 9, with the single arm differential height mechanism, the front twin wheels are aligned very close. The frame 1 may tilt and one side wheels are raised up in the turning direction to counter balance the eccentric force. The recovering force of the single arm 89 will force the front wheels 90 to point forward and the front fork 8 returning to its natural position. There are smooth transition from four wheel drive, three wheel drive to two wheel drive and vice versa. The motorcycle doesn't have such a kind of smooth transition and recovering forces to return to its natural equilibrium point. So the motorcar is much more safe to operate than the motorcycle does. Furthermore, the cars or the other four wheel vehicles such as Cunningham's car doesn't have the capability to raise its wheels. In high speed turning, the car will overturn. The motorcar may operate in much larger range of eccentric force in turning. The outside wheels of motorcar may raise up from the ground to counter balance the large eccentric force. The motorcar is even more safe to operate than the car.

Figures 15A, 15B, 15C, 15D:
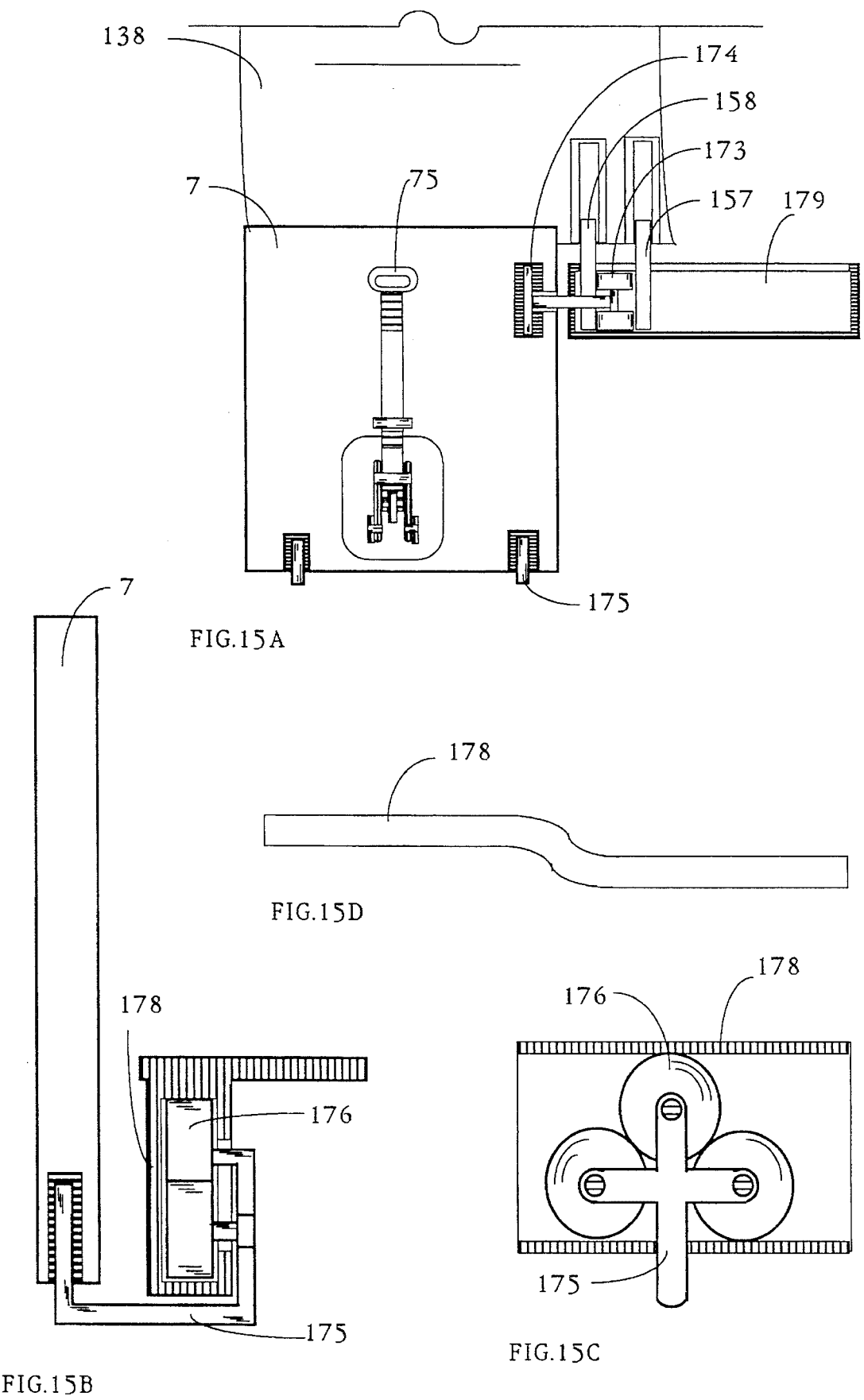

FIG. 15 shows the detailed mechanism of the sliding door. The sliding door 7 are mounted on two pivot bar 175 and is held by the pivot bar 174. As shown in FIG. 15B and FIG. 15C, the pivot bar 175 is mounted on the rollers 176. The rollers 176 rolls in the track 178. As shown in FIG. 15A, the pivot bar 174 is held by the rollers 173. The rollers 173 rolls in the track 179. FIG. 15D is the top view of the track 178. The track 178 is located beneath the motorcar. It is a slot to guide the sliding door 7. There is one option for the cooperation between the sliding door and the sliding top cover. As shown in FIG. 18F and FIG. 15A, the finger 157 and 158 of the sliding top cover 138 are inserted in the track 179. The finger 157 and 158 may be pushed into the track 179 or pulled out of the track 179. As the roller 173 rolls, the rollers 173 will push the finger 157 or 158 to move together. As the sliding door 7 is open to slide backward, the sliding top cover 138 will be pulled backward at the same time. If the finger 158 is pushed into the track 179, as the slideing door is closed, the sliding top cover will be closed at the same time. If the the finger 158 is pulled out of the track 179, as the slideing door is closed, the sliding top cover stays open.

Figure 16A:
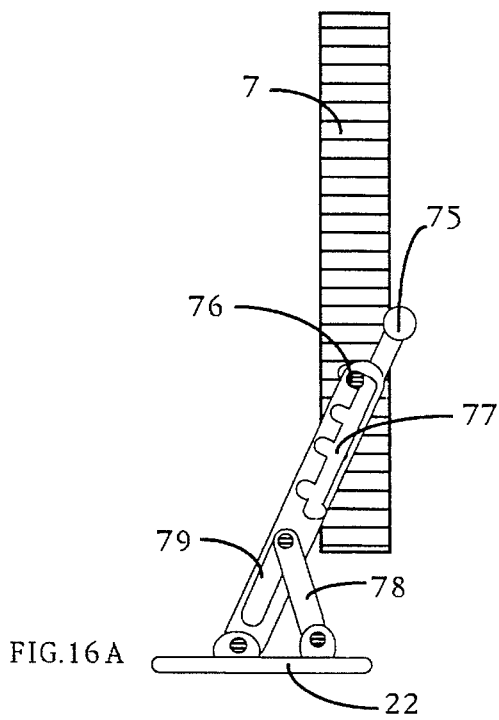
Figure 16C:
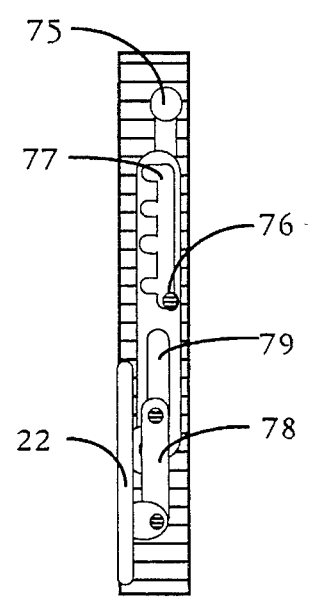
Figure 16B:
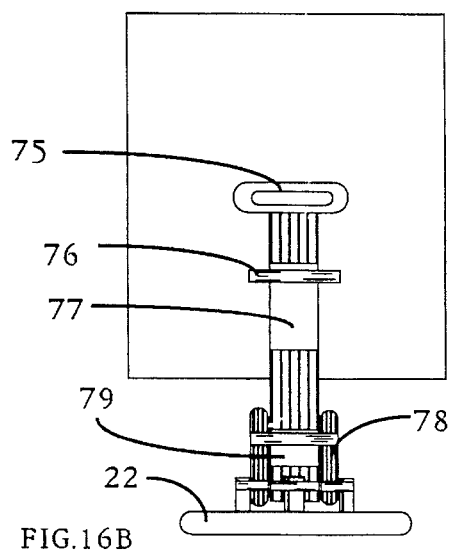
Figure 16D:
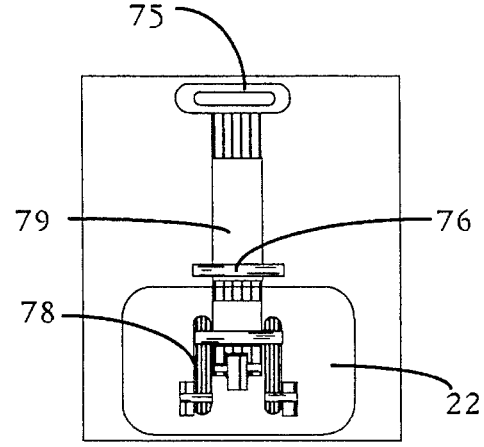

Since the motor car has very narrow base. As the side wind is high and the motor car stands still, with the top cover, there is the risk that the motorcar will overturn. We need the side support pad for the long period parking in the very strong wind. The foot operating auxiliary parking pad is for the short stoping time. FIG. 16 shows the detailed mechanism of the side supporting pad and auxiliary parking pad. As shown in FIG. 16C and FIG. 16D, the side supporting pad is embedded in the sliding door. Pulling down the handle 75, the side supporting pad slides downward as shown in FIG. 16A and FIG. 16B. The locking bar 76 is fit in the knotch of slot 77 to lock. The sliding link 78 of the pad 22 slides in the slot 79 to lay the pad 22 on the ground.

Figure 16E:
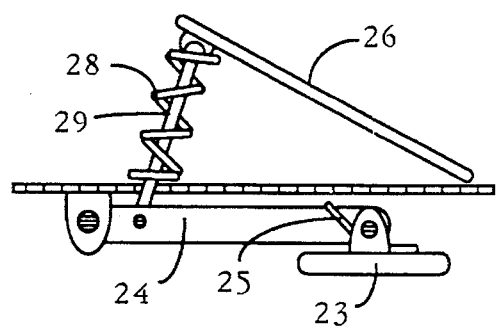
Figure 16F:
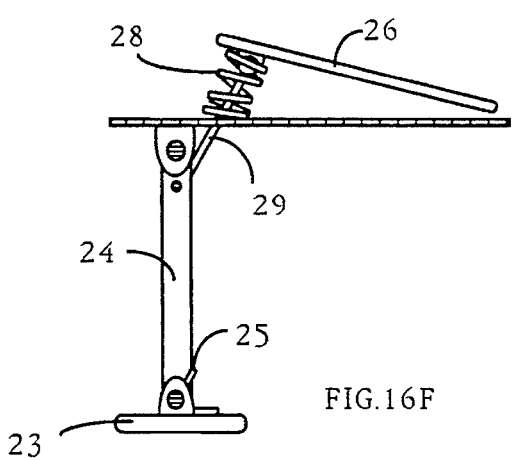

FIG. 16E and FIG. 16F shows the operations of the foot operating auxiliary pad. Stepping on the foot pad 26, the spring 28 is under compression and the link 29 pushes the supporing link 24 rotating downward. As the supporting pad 23 contacts with the ground, the pad 23 overcomes the force of biasing spring 25 and becomes flat to contact with the ground as shown in FIG. 16F. Release the foot pad 26, the spring 28 expands and retrieve the support pad 23 as shown in FIG. 16E.

The fundamental pattern of the motor car is discussed as above. There are many different variations of the fundamental pattern of the motorcar. FIG. 17 is the motorcar equipped with the snow tire 91. The motorcar has the sliding door 343.

Figure 18D:
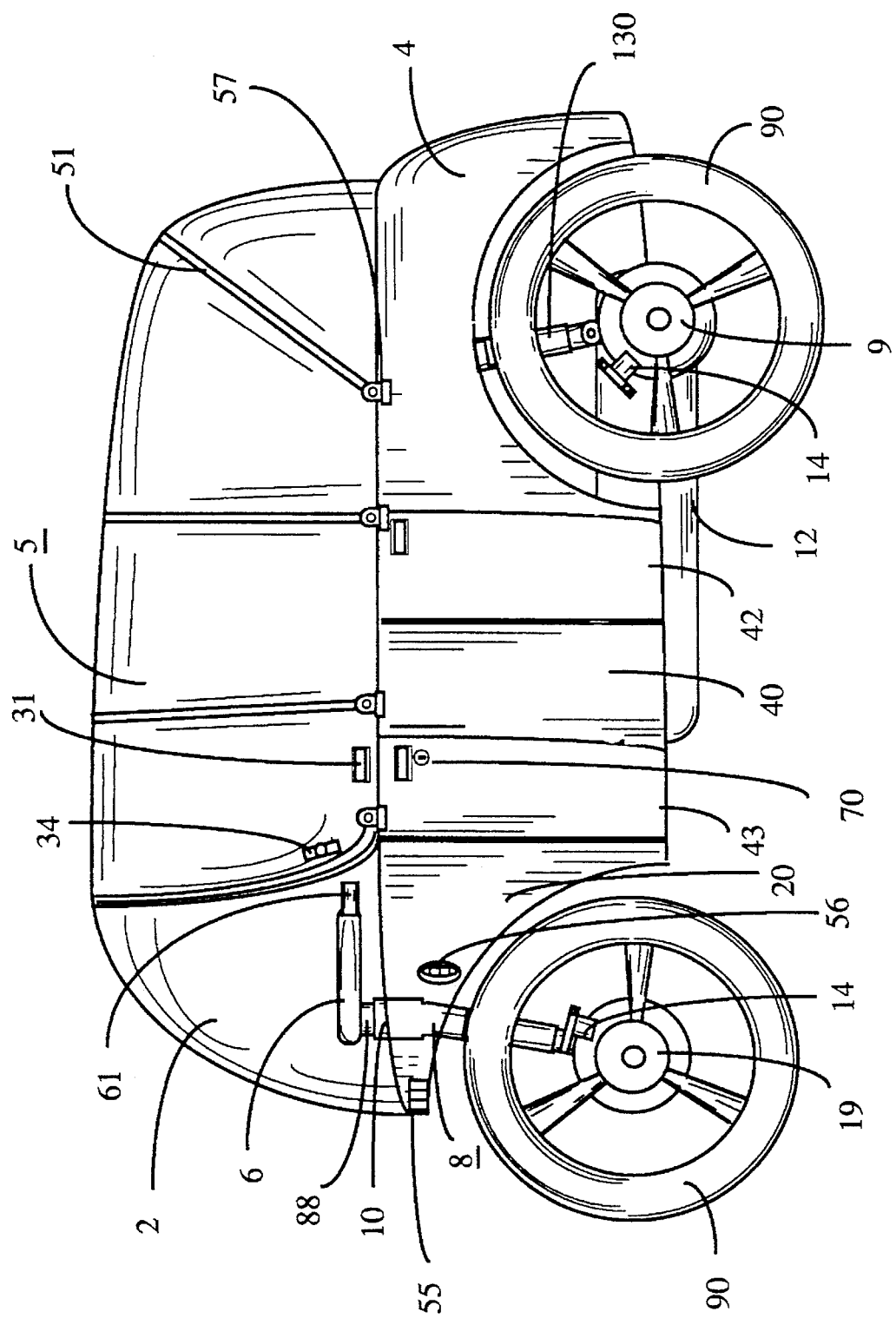
Figure 18E:
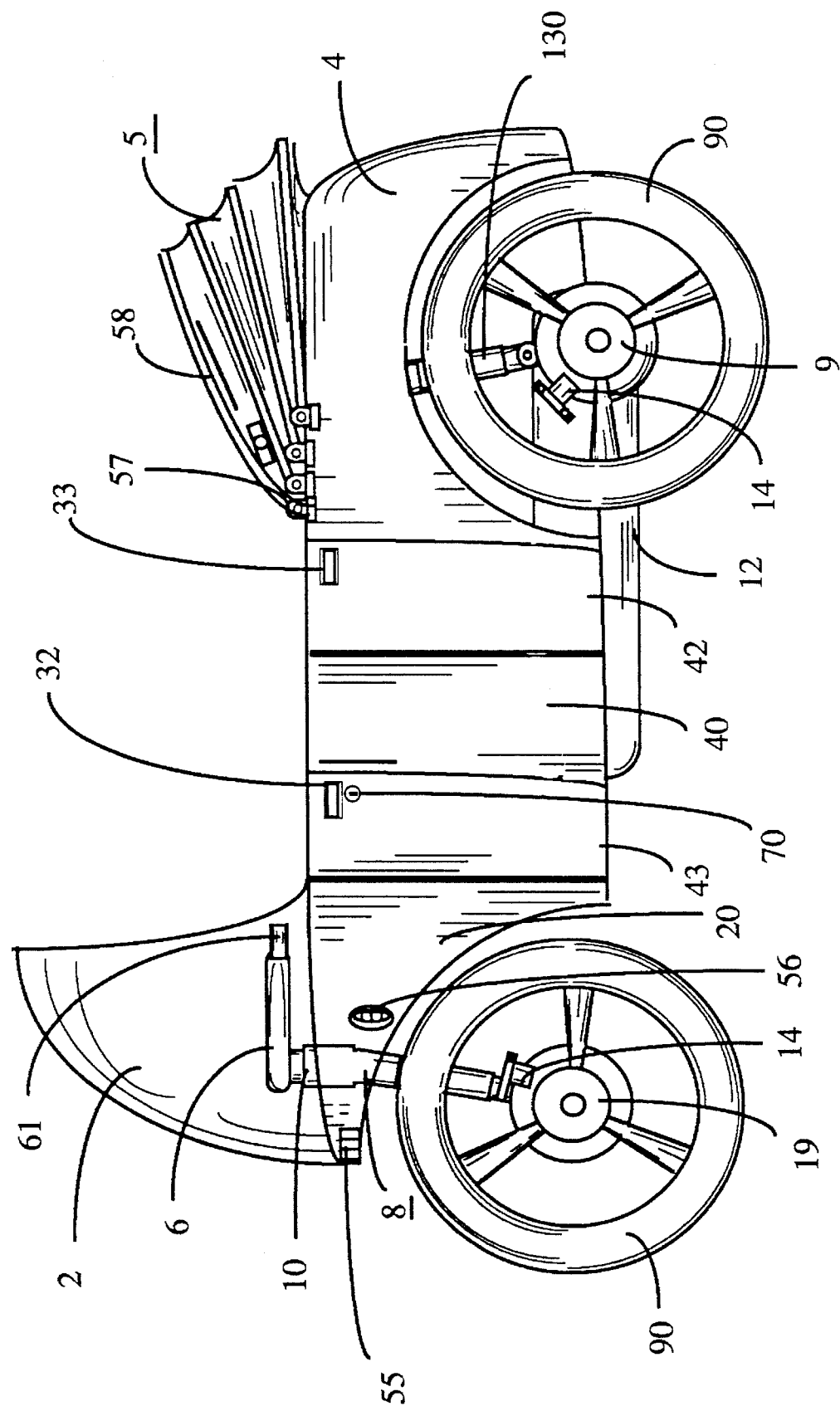
Figure 18F:
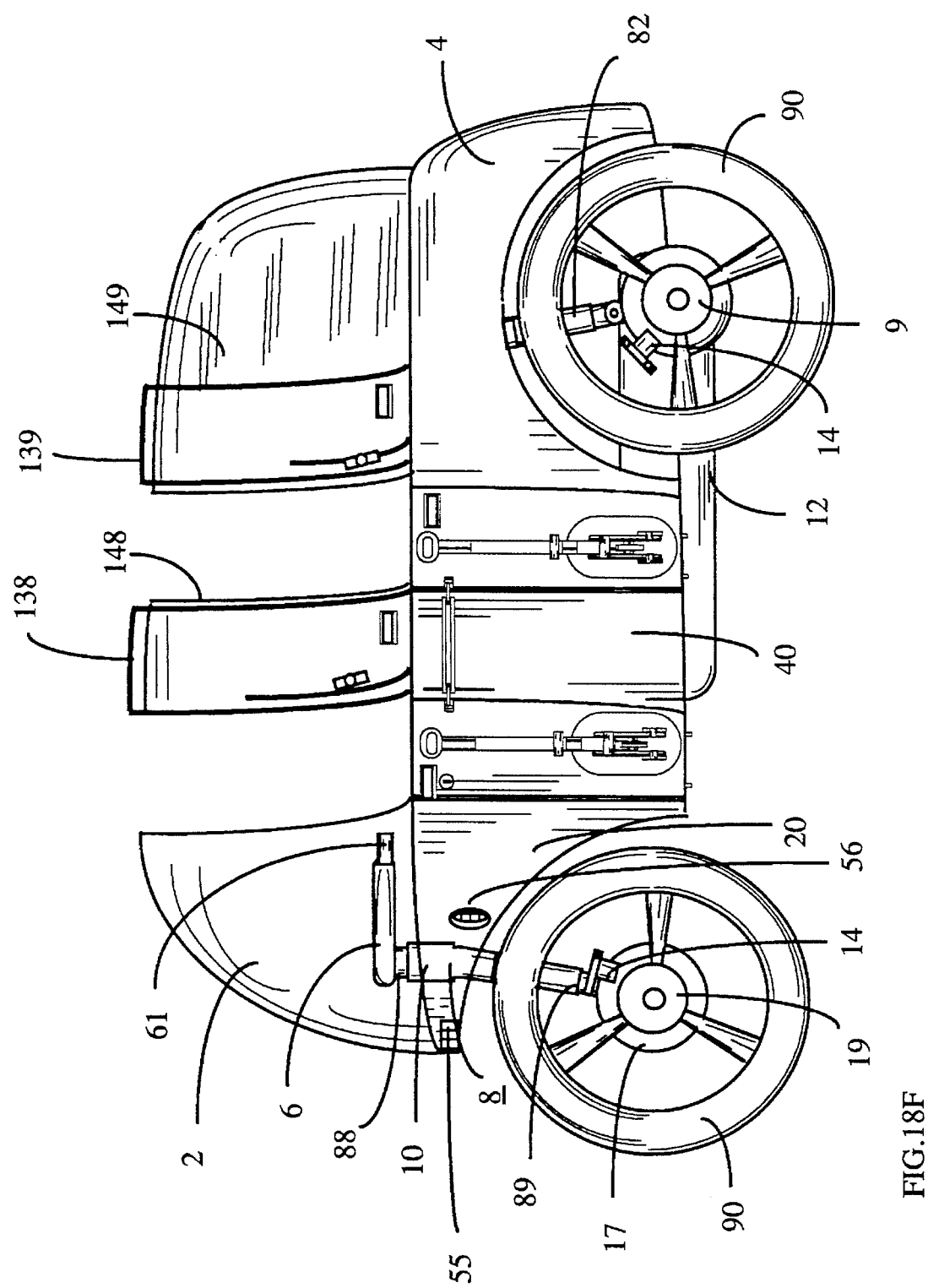
Figure 19A:
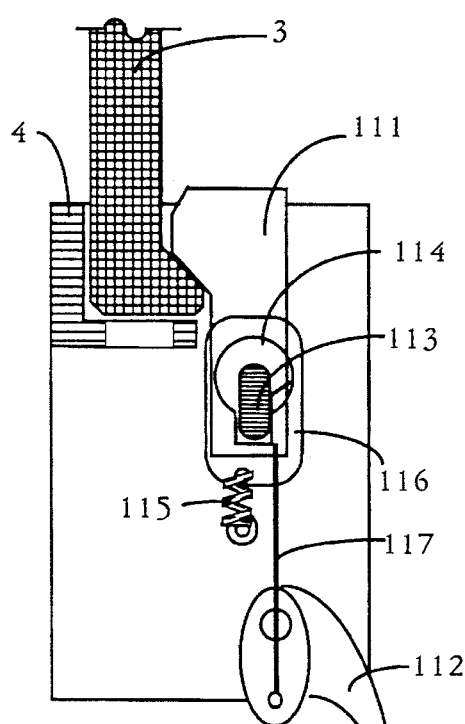
Figure 19B:
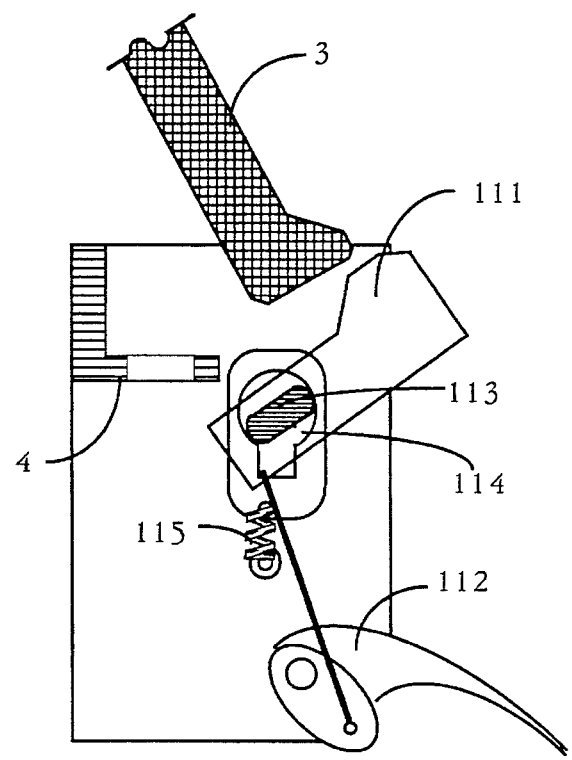
Figure 19C:
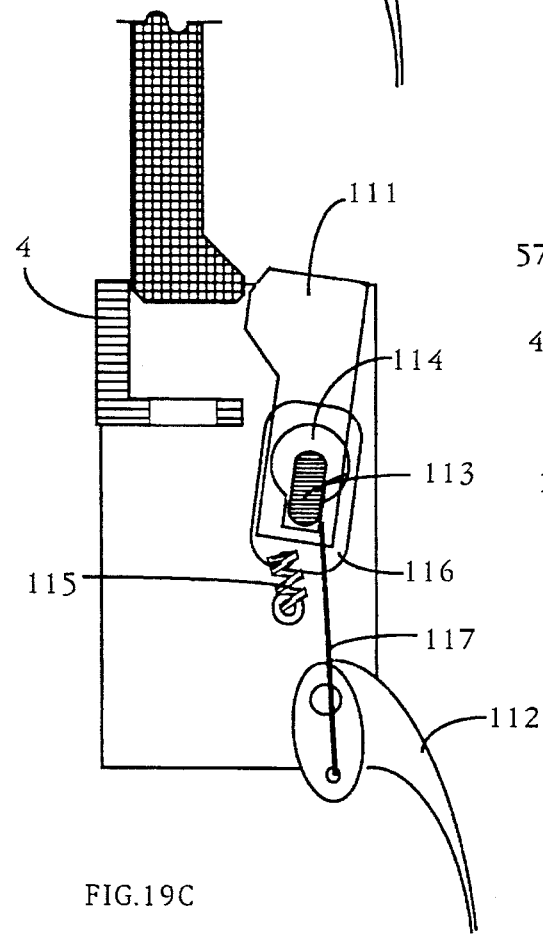
Figure 19D:
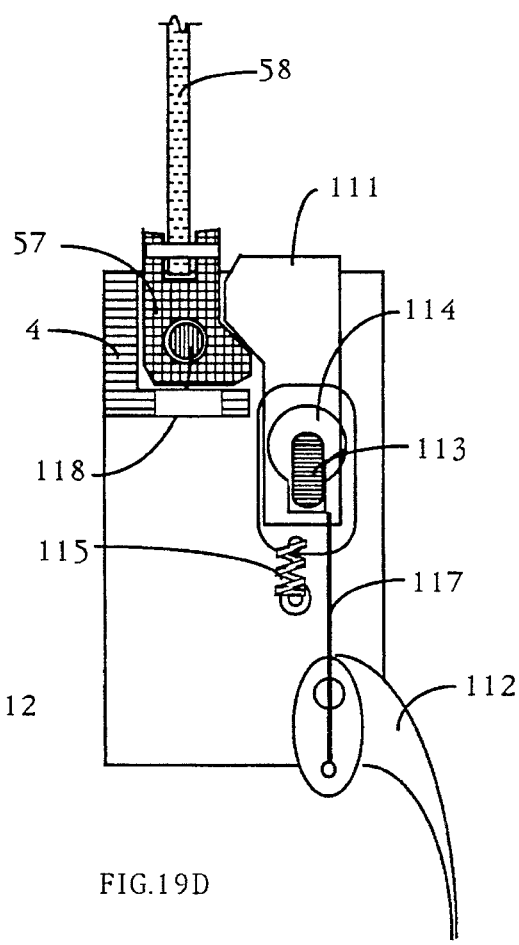

In FIG. 18A, the cover 3 can slide backward as shown in FIG. 18B and raise up sideward as shown in FIG. 18C. The pivot joint 3J of the top cover 3 is shown in FIG. 18G. The door 43 and 42 can be opened to have the riders to sit in. As shown in FIG. 18D, the top cover of motorcar can be replaced with the hood top cover 5 easily. The frames 51 are hinged at the sliding pads 57. As shown in FIG. 18E, the hood top cover 5 slides backward and piles up at the rear portion of the car. FIG. 18F shows the sliding top covers 138 and 139 are in the form of the combination of window and skylight.

As shown in FIG. 19, on the top of the side walls of the motorcar, there are sliding slots for the top cover to slide on it and lock to it. The sliding slot is formed by the lock bar 111 and the wall 4. As shown in FIG. 19B, pulling up the cam handle 112, the link 117 pushes the key 113 upward and rotates in the keyhole 114. The lock bar 111 rotates and the the top cover 3 is released. As shown in FIG. 19C, pushing the top cover 3 downward, the bracket 116 will rotates a little to allow the top cover 3 to be inserted into the slot. Under the bias of the spring 115, the bracket 116 will return back to the locking position as shown in FIG. 19A. FIG. 19D shows the same slot may be applied to the hood cover, too. The link 58 is mounted on the pad 57. There is one guiding rod 118 passes through the pad 57. It is pretty easy to replace the silding top cover 3 with the hood cover 5.

It is noted that the front wheels may adopt the automobile steering structure and shock tubes. However, the automobile mechanisms are too complex to be implemented in such a narrow space of motorcar. So the steering shock tube are invented to have both functions of steering and cushion. In FIG. 20, FIG. 21, FIG. 22 and FIG. 23, they show the detailed structures of alternative designs of front fork.

In FIG. 20A, the steering post constitutes of the upper steering rods 62 and lower steering rod 63. The upper portion of steering rod 62 is round; the lower portion of steering rod 62 is square. As shown in FIG. 20, the claw 65 constitutes of the square hollow cylinder 65s and an universal joint 65u. The horizontal segment of square cylinder 63 slides inside the square hole 65s of cylinder 65. Swiveling the handlebar 6, the horizontal square rod 63 swivels to force the shift level 64 to shift left and right. The square cylinder 65s slides on the horizontal segment of square cylinder 63. The universal joint 65u pivotally grasps the ball 64u to shift the level 64 left and right. The level 64 forces the level arm 66 to swivel the lower cylinder 82. The lower cylinder 82 rotates to change the direction of wheel 90. The ball joints 66u of level arm 66 and the ball joint 64u of level arm 64 adapts to the different heights of right wheel and left wheel. The universal joint of level arm 64 holds the ball 66u to swivel the level arm 66.

FIG. 21 is the alternative design of the front fork. The cushion mechanism and the steering mechanism are separated. The upper cylinder 89 is steerable. The bearing 99 reduces the frictional force during the rotation of the upper cylinder 98. The level arm 56 swivels to change the direction of wheel 90. The stub 56s fits in the hole of steering level arm 54. The steering rod 53 swivels to shift the level arm 54. To adjuste the steering motions, the horizontal segment of steering post 53 slides in the hollow cylinder 55c; the stub 55s rotates in the hole of shift level arm 54.

As shown in FIG. 22, motorcar may adopt the steering wheel 160 to shift the level arm 156 with the steering gears 171 and 172. The steering gears 172 is at the end of the steering post 153. The gear 171 is knotched on the shift level 154.

FIG. 23 is the front wheel drive design. The motor 190 drives the front wheels with the differential drive mechanism embedded in the hub 9. The steering joint 188 is a universal joint. The ring 192 is fixed to the frame 1. To hold the front fork, the bracket 197 has one pole passing through the ring 192. Two rubber pads 193 clamp the ring 192. The rubber pads 193 serve as the cushion to damp the shock and adapt to the steering.

Although the description above contains many specificities, these should not be construed as limiting the scope of the invention but as merely providing illustrations of some of the presently preferred embodiments of this invention. Thus the scope of the invention should be determined by the appended claims and their legal equivalent, rather than by the examples given.

What I claim is:

1. A vehicle comprising a frame, wheels and a noncontact gripping force driving mechanism, said noncontact gripping force driving mechanism comprises an engaging means which enabling slow wheel to be engaged to drive and fast wheel to be disengaged to free run, said engaging means comprising a hub body, a driving drum, poles of noncontact force, a driving shaft and a shift screw, said poles of noncontact force being embedded inside said driving drum and said frame, said shift screws being on said driving shaft, said engaging drum being rotationally mounted on said shift screw, said poles of noncontact force being coupled between said driving drum and said frame to provide gripping force to said driving drum, said driving shaft being supported on a truck with bearings being mounted on the driving shaft, said hub body being mounted on said bearings, a rotational motion of said driving shaft being transferred from said shaft to said hub body through the incorporation of said hub body and said driving drum, as said shaft being rotated in one direction, said drum being pushed toward a wall of said hub body to engage said hub body, said hub body being rotated together with said shaft, as said shaft slowing down, said hub body disengaging with said drum and becoming free running, as said shaft being rotated in a reverse direction, said drum being pushed toward another wall of said hub body to engage said hub body, said hub body being rotated in a reverse direction.

2. A vehicle according to claim 1, said poles of noncontact force are magnetic poles.

3. A vehicle according to claim 1, said driving mechanism is a differential mechanism and said shaft being a nondivided and continuous axle, at least two of said wheels being rotationally mounted on said nondivided continuous axle to drive said vehicle.

4. A vehicle according to claim 1 further includes wedge blocks, said wedge blocks being inserted between said engaging drum and said hub body, said wedge block transforming lateral force to be radial engaging force;

as said shaft rotating said driving drum, said drum being shifted to squeeze said wedge blocks to engage with said hub body to drive said hub body to rotate.

5. A vehicle comprising a frame, wheels and upper bounded lateral gripping force driving mechanisms, said upper bounded lateral gripping force driving mechanism comprises an engaging means which enabling slow wheel to be engaged to drive and fast wheel to be disengaged to free run, said engaging means comprising a hub body, an driving drum, grippers, gripping spring, a driving shaft and a shift screw, one of said gripper having a protrudes to fit in a knotch on said driving drum, another of said gripper having a protrude to fit in a knotch on said frame, said gripping spring being inserted between said two grippers, said shift screws being on said driving shaft, said engaging drum being rotationally mounted on said shift screw, said gripping spring expanding to push said grippers against said driving drum and said hub to provide gripping force to said driving drum, said driving shaft being supported on a truck with bearings being mounted on the driving shaft, said hub body being mounted on said bearings, a rotational motion of said driving shaft being transferred from said shaft to said hub body through the incorporation of said hub body and said driving drum, as said shaft being rotated in one direction, said drum being pushed toward a wall of said hub body to engage said hub body, said hub body being rotated together with said shaft, as said shaft slowing down, said hub body disengaging with said drum and becoming free running, as said shaft being rotated in a reverse direction, said drum being pushed toward another wall of said hub body to engage said hub body, said hub body being rotated in a reverse direction.

6. A vehicle according to claim 5, said driving mechanism is a differential mechanism and said shaft being a nondivided and continuous axle, at least two of said wheels being rotationally mounted on said nondivided continuous axle to drive said vehicle.

7. A vehicle according to claim 5 further including wedge blocks, said wedge blocks being inserted between said engaging drum and said hub body, said wedge block transforming lateral force to be radial engaging force;

as said shaft rotating said driving drum, said drum being shifted to squeeze said wedge blocks to engage with said hub body to drive said hub body to rotate.

8. A vehicle comprising a frame, wheels and differential driving mechanism, said differential driving mechanism comprises a nondivided and continuous axle and engaging means which enabling slow wheel to be engaged to drive and fast wheel to be disengaged to free run, at least two of said wheels being rotationally mounted on said nondivided continuous axle to drive said vehicle;

said engaging means comprising a hub body, an driving drum, a nondivided continuous driving shaft and shift screws, said shift screws being on said driving shaft, said engaging drum being rotationally mounted on said shift screw, said gripping force being coupled between said driving drum and said frame to provide gripping force to said driving drum, said driving shaft being supported on a truck with bearings being mounted on the driving shaft, said hub body being mounted on said bearings, a rotational motion of said driving shaft being transferred from said shaft to said hub body through the incorporation of said hub body and said driving drum, as said shaft being rotated in one direction, said drum being pushed toward a wall of said hub body to engage said hub body, said hub body being rotated together with said shaft, as said shaft slowing down, said hub body disengaging with said drum and becoming free running, as said shaft being rotated in a reverse direction, said drum being pushed toward another wall of said hub body to engage said hub body, said hub body being rotated in a reverse direction.

9. A vehicle according to claim 8 further including wedge blocks, said wedge blocks being inserted between said engaging drum and said hub body, said wedge block transforming lateral force to be radial engaging force;

as said shaft rotating said driving drum, said drum being shifted to squeeze said wedge blocks to engage with said hub body to drive said hub body to rotate.

10. A vehicle according to claim 8, wherein said wheels are groovy wheels, said vehicle further comprising tension wheels, belts and belt tension adjusting mechanisms, said belt enwrapping around said tension wheel and groovy wheel, said belt tension adjusting mechanism comprising an adjusting means to move an axle of said tension wheel to adjust the tension in the belt.

11. A vehicle according to claim 8, wherein said groovy wheels have a central slot in a central portion of rim, said belt having a central protrusion fitting in said central slot.

12. A vehicle according to claim 8 further comprising a foot operated auxiliary support pad, said foot operated auxiliary support pad comprising a foot pad, supporting pad and a link, stepping on said foot pad, said link pushing said supporting pad to rotate to contact with ground.

13. A vehicle according to claim 8 further comprising a shield, said shield mounted on said frame, a sliding door being slidable mounted on said shield.

14. A vehicle according to claim 13 further comprising a sliding door having rollers rolling inside a track beneath said vehicle, a bracket mounted on said vertical rollers to support aid sliding door, a pivot mounting on a side of said sliding door to pull said sliding door, said pivot being mounted on horizontal rollers rolling inside a horizontal track on a side wall of said vehicle.

15. A vehicle according to claim 14 further comprising a sliding top cover, said top cover having fingers inserted inside said horizontal track and being pushed by said horizontal rollers.

16. A vehicle according to claim 8 further comprising a slidable top cover, said top cover is slidablely mounted on said frame.

17. A vehicle according to claim 16 further comprising a raising-up top cover, said top cover mounted on said frame can be raised up.

18. A vehicle according to claim 17 further comprising a top cover locking mechanism, said locking mechanism comprising a rotatable bar, pull up cam handle, a key hole and pivot, pulling up said handle, said lock bar raised up and said pivot rotating inside said key hole to rotate said lock bar to release said top cover.

19. A vehicle according to claim 8 further comprising a hood top cover, said foldable shield is slidablely and foldably mounted on said frame.

20. A vehicle according to claim 8, wherein said frame further comprises a front seat and a rear seat, a space being left between said front seat and said rear seat.

21. A vechicle according to claim 8 further comprising a front seat and a back seat, said front seat may lie down to form saddle seat, said front seat and saddle seat constituting a plane with said rear seat.

22. A vehicle according to claim 8 further comprising a motor means, the steering shock absorbing mechanism having arms mounted on extensions of said motor means, said motor means driving the driving shaft to rotate wheels.

23. A vehicle according to claim 8 further comprising a steering means, said steering means comprising a universal joint, said frame embracing said universal joint, a ring being fixed to said frame, a bracket being fixed to said steering means, said bracket having a pole passing said ring, said ring being clamped by cushion means (FIG. 23A).

24. A vehicle according to claim 8 further comprising a handlebar, steering shock absorbing mechanism, and a steering wheel, said frame having a bracket pivotally holding a steering post of said handlebar, and being supported by a steering shock absorbing mechanisms, said steering wheel being rotationally mounted on a horizontal axle of said steering shock absorbing mechanism, said steering shock absorbing mechanism tilting backward, a lower portion of said steering shock absorbing mechanism being slidable relative to an upper portion of said steering shock absorbing mechanism to absorb the shock, said steering wheel rotating to drive steering gears to shift a shift lever to rotate said wheel.

25. A vehicle according to claim 8 further comprises a side supporting pad, said side supporting pad comprising a handle, pad and link, pulling down said handle, a pivot bar sliding inside a slot of said handle and being locked in a knotch of said handle, said link sliding in another slot of said handle to align said pad on ground.

26. A vehicle comprising a differential height mechanism, said differential height mechanism comprising a handlebar means, steering shock absorbing mechanisms and twin wheels, a frame being supported by said steering shock absorbing mechanism and having a bracket pivotally holding a steering post of said handlebar means, said steering shock absorbing mechanism having a fork structure comprising two single arms, each single arm comprising an steering shock tube only, said steering shock tube comprising an upper portion and a lower portion, said upper portion and said lower portion only slidably fitting into each other, each of said lower portion having a horizontal axle at one end, a wheel of said twin wheel being rotationally mounted on each of said axle, said arms adjusting its length respectively to keep the wheels lying on ground during steering, said steering shock absorbing mechanism tilting and being able to recover to a natural straight forward position after steering.

27. A vehicle according to claim 1 further comprising a handlebar and a steering shock absorbing mechanisms, a frame being supported by said steering shock absorbing mechanism and having a bracket pivotally holding a steering post of said handlebar, at least two wheels being rotationally mounted on a horizontal axle of said steering shock absorbing mechanism, said steering shock absorbing mechanism having a fork structure comprising two single arms, each single arm comprising a steering shock tube, said steering shock tube comprising an upper portion and a lower portion, said upper portion and said lower portion slidably fitting into each other, each of said lower portion having a horizontal axle at one end, a wheel being rotationally mounted on each of said axle, said arms adjusting its length respectively to keep the wheels lying on ground during steering, said steering shock absorbing mechanism tilting and being able to recover to a natural straight forward position after steering.

28. A vehicle according to claim 27, wherein said handlebar, said steering post and upper portion of said steering shock absorbing mechanism are an integrated unit as a front fork (FIG. 9), said lower portion of said steering shock tube being slidable inside said upper portion of said steering shock tube only, as said handlebar swivelling, said front fork rotating to turn said wheels.

29. A vehicle according to claim 27, said upper portion of said steering shock absorbing mechanism is fixed to said frame, said lower portion of said steering shock absorbing mechanism being swiveled by said steering post (FIG. 20).

30. A vehicle according to claim 27 further comprising a shift lever (FIG. 20C), in the middle of said shift lever having a first ball joint, a sliding element having one end being a portion of said first ball joint, at other end of said sliding element being a square hollow cylinder, said square cylinder sliding on a horizontal level of said steering post, at one end of said shift lever having a second ball joint, at the other end of said shift level having a third ball joint, a right swivel arm swiveling the lower portion of said steering shock absorbing mechanism to turn right, said right swivel arm constituting portion of said right ball joint, a left swivel arm swiveling the lower portion of said steering shock absorbing mechanism to turn left, said left swivel arm constituting portion of said left ball joint.

31. A vehicle according to claim 27, wherein the upper portion of said steering shock absorbing mechanism is swiveled by said steering post to turn the wheels (FIGS. 21 & 22).

32. A vehicle according to claim 31, further comprising a shift lever (FIG. 21C), in the middle of said shift lever having a pivotal joint, a sliding element having one end constituting a portion of said pivotal joint, at other end of said sliding element being a hollow cylinder, said hollow cylinder sliding on a horizontal level of said steering post, at both ends of said shift level having a left and a right pivotal joints respectively, a right swivel arm swiveling the upper portion of said steering shock absorbing mechanism to turn right, said right swivel arm constituting a portion of said right pivotal joint;

a left swivel arm swiveling the upper portion of said steering shock absorbing mechanism to turn left, said left swivel arm constituting a portion of said left pivotal joint.

33. A vehicle according to claim 27, further comprising a resilient pivot joint and a rear shock absorbing mechanism supporting a rear portion of said frame, said rear shock absorbing mechanism being supported on a rear axle of rear wheels, said rear shock abosrbing mechanism comprising a low rigid pivot joint and an upper resilient joint having limited allowance for tilting of said frame, as said frame being tilted, one side wheel being raised up from ground and said vehicle dvring with single side wheels.

34. A vehicle according to claim 33, wherein said resilient pivot joint being a yoke longitudinally pivotally mounted on a rear portion of said frame, a front portion of a transmission box being transversely mounted on a fork of said yoke.

* * * * *